(12) United States Patent
Ravikumar et al.

(10) Patent No.: US 7,656,870 B2
(45) Date of Patent: Feb. 2, 2010

(54) SYSTEM AND METHOD FOR PEER-TO-PEER HYBRID COMMUNICATIONS

(75) Inventors: Sivakumar Ravikumar, Allen, TX (US); Satish Gundabathula, Irving, TX (US); Rameshkumar Ravikumar, Allen, TX (US)

(73) Assignee: Damaka, Inc., Richardson, TX (US)

( * ) Notice: Subject to any disclaimer, the term of this patent is extended or adjusted under 35 U.S.C. 154(b) by 604 days.

(21) Appl. No.: 11/081,068

(22) Filed: Mar. 15, 2005

(65) Prior Publication Data

US 2005/0286519 A1 Dec. 29, 2005

Related U.S. Application Data

(60) Provisional application No. 60/583,536, filed on Jun. 29, 2004, provisional application No. 60/628,183, filed on Nov. 15, 2004, provisional application No. 60/628,291, filed on Nov. 17, 2004.

(51) Int. Cl.
*H04L 12/56* (2006.01)

(52) U.S. Cl. .......................... 370/389; 370/420
(58) Field of Classification Search .............. None
See application file for complete search history.

(56) References Cited

U.S. PATENT DOCUMENTS

| | | | |
|---|---|---|---|
| 5,761,309 A | 6/1998 | Ohashi et al. | |
| 6,141,687 A | 10/2000 | Blair | |
| 6,219,638 B1 | 4/2001 | Padmanabhan et al. | |
| 6,360,196 B1 | 3/2002 | Poznaski et al. | |
| 6,826,613 B1 | 11/2004 | Wang et al. | |
| 7,013,155 B1* | 3/2006 | Ruf et al. | 455/466 |
| 7,117,526 B1 | 10/2006 | Short | |
| 2002/0097150 A1 | 7/2002 | Sandelman et al. | |
| 2002/0143548 A1 | 10/2002 | Korall et al. | |
| 2002/0150110 A1 | 10/2002 | Inbar et al. | |
| 2003/0009565 A1 | 1/2003 | Arao | |
| 2003/0061025 A1 | 3/2003 | Abir | |
| 2003/0135569 A1 | 7/2003 | Khakoo et al. | |
| 2003/0158722 A1 | 8/2003 | Lord | |
| 2003/0177186 A1* | 9/2003 | Goodman et al. | 709/205 |

(Continued)

FOREIGN PATENT DOCUMENTS

WO    WO 03/079635    9/2003

(Continued)

OTHER PUBLICATIONS

Rory Bland, et al., "P2P Routing".

(Continued)

*Primary Examiner*—Jayanti K Patel
*Assistant Examiner*—Anthony Sol
(74) *Attorney, Agent, or Firm*—Howison & Arnott, L.L.P.

(57) ABSTRACT

An improved system and method are disclosed for peer-to-peer communications. In one example, the method includes retrieving a profile and a routing table from an access server by a first endpoint during an authentication process. The profile identifies at least a second endpoint as an endpoint with which the first endpoint has permission to communicate. The routing table contains address information needed for the first endpoint to communicate directly with the second endpoint. The first endpoint sends a notification message directly to the second endpoint using the address information to inform the second endpoint that the first endpoint is online.

22 Claims, 26 Drawing Sheets

U.S. PATENT DOCUMENTS

| | | | |
|---|---|---|---|
| 2003/0187650 A1 | 10/2003 | Moore et al. | |
| 2004/0034776 A1* | 2/2004 | Fernando et al. | 713/171 |
| 2004/0039781 A1 | 2/2004 | Lavallee et al. | |
| 2004/0044517 A1 | 3/2004 | Palmquist | |
| 2004/0139228 A1 | 7/2004 | Takeda et al. | |
| 2004/0143678 A1 | 7/2004 | Chari et al. | |
| 2004/0153858 A1 | 8/2004 | Hwang | |
| 2004/0267527 A1 | 12/2004 | Creamer et al. | |
| 2004/0268257 A1 | 12/2004 | Mudusuru | |
| 2005/0071481 A1 | 3/2005 | Danieli | |
| 2005/0187957 A1 | 8/2005 | Kramer et al. | |
| 2006/0121986 A1* | 6/2006 | Pelkey et al. | 463/40 |
| 2006/0168643 A1 | 7/2006 | Howard et al. | |
| 2006/0230166 A1 | 10/2006 | Philyaw | |
| 2007/0078785 A1 | 4/2007 | Bush et al. | |
| 2007/0111794 A1 | 5/2007 | Hogan et al. | |
| 2007/0190987 A1* | 8/2007 | Vaananen | 455/414.1 |
| 2008/0005328 A1 | 1/2008 | Shivley et al. | |

FOREIGN PATENT DOCUMENTS

| | | |
|---|---|---|
| WO | WO 2005/009019 | 1/2005 |
| WO | WO 2005/079635 | 9/2005 |

OTHER PUBLICATIONS

Jeff Tyson, "How Instant Messaging Works", www.verizon.com/learningcenter, Mar. 9, 2005.

Salman A. Baset, et al., "An Analysis Of The Skype Peer-To-Peer Internet Telephony Protocol", Department of Computer Science, Columbia University, New York, NY, USA, Sep. 15, 2004.

Chathapuram, "Security in Peer-to-Peer Networks", Aug. 8, 2001, XP002251813.

International Search Report and Written Opinion of the International Searching Authority from PCT/IB2005/000821, dated Aug. 5, 2005.

Rosenberg, "Stun—Simple Traversal of UDP Through NAT", Sep. 2002, XP015005058.

Singh et al., "Peer-to-Peer Internet Telephony Using SIP", Department of Computer Science, Columbia University, Oct. 31, 2004, XP-002336408.

* cited by examiner

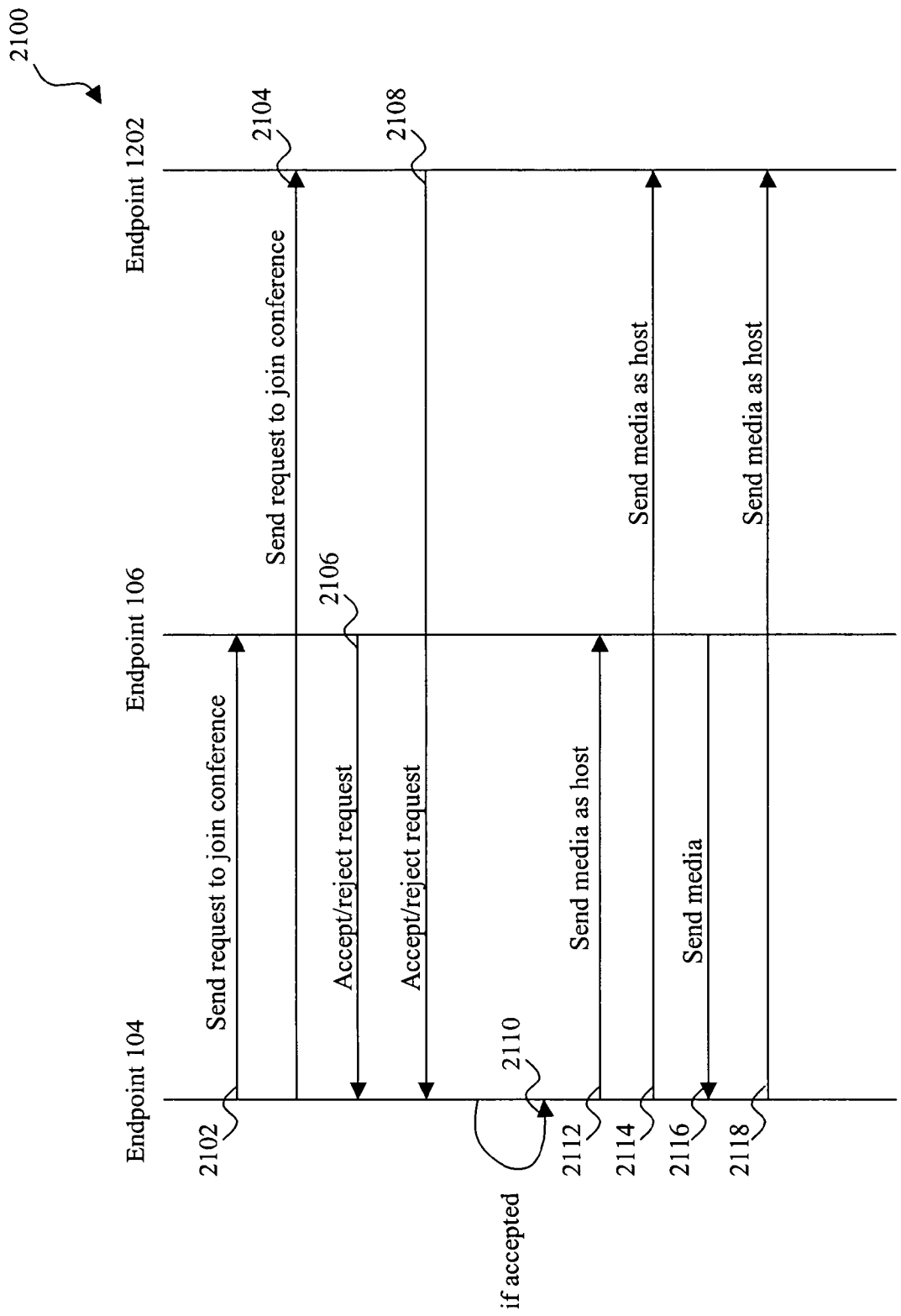

SYSTEM AND METHOD FOR PEER-TO-PEER HYBRID COMMUNICATIONS

The present application claims the benefit of U.S. Provisional Patent Ser. Nos. 60/583,536, filed Jun. 29, 2004, 60/628,183, filed Nov. 15, 2004, and 60/628,291, filed Nov. 17, 2004, all of which are hereby incorporated by reference.

BACKGROUND

Current packet-based communication networks may be generally divided into peer-to-peer networks and client/server networks. Traditional peer-to-peer networks support direct communication between various endpoints without the use of an intermediary device (e.g., a host or server). Each endpoint may initiate requests directly to other endpoints and respond to requests from other endpoints using credential and address information stored on each endpoint. However, because traditional peer-to-peer networks include the distribution and storage of endpoint information (e.g., addresses and credentials) throughout the network on the various insecure endpoints, such networks inherently have an increased security risk. While a client/server model addresses the security problem inherent in the peer-to-peer model by localizing the storage of credentials and address information on a server, a disadvantage of client/server networks is that the server may be unable to adequately support the number of clients that are attempting to communicate with it. As all communications (even between two clients) must pass through the server, the server can rapidly become a bottleneck in the system.

Accordingly, what is needed are a system and method that addresses these issues.

BRIEF DESCRIPTION OF THE DRAWINGS

FIG. 21 is a sequence diagram illustrating an exemplary process by which an endpoint may establish a conference call with other endpoints.

DETAILED DESCRIPTION

Figure 1:
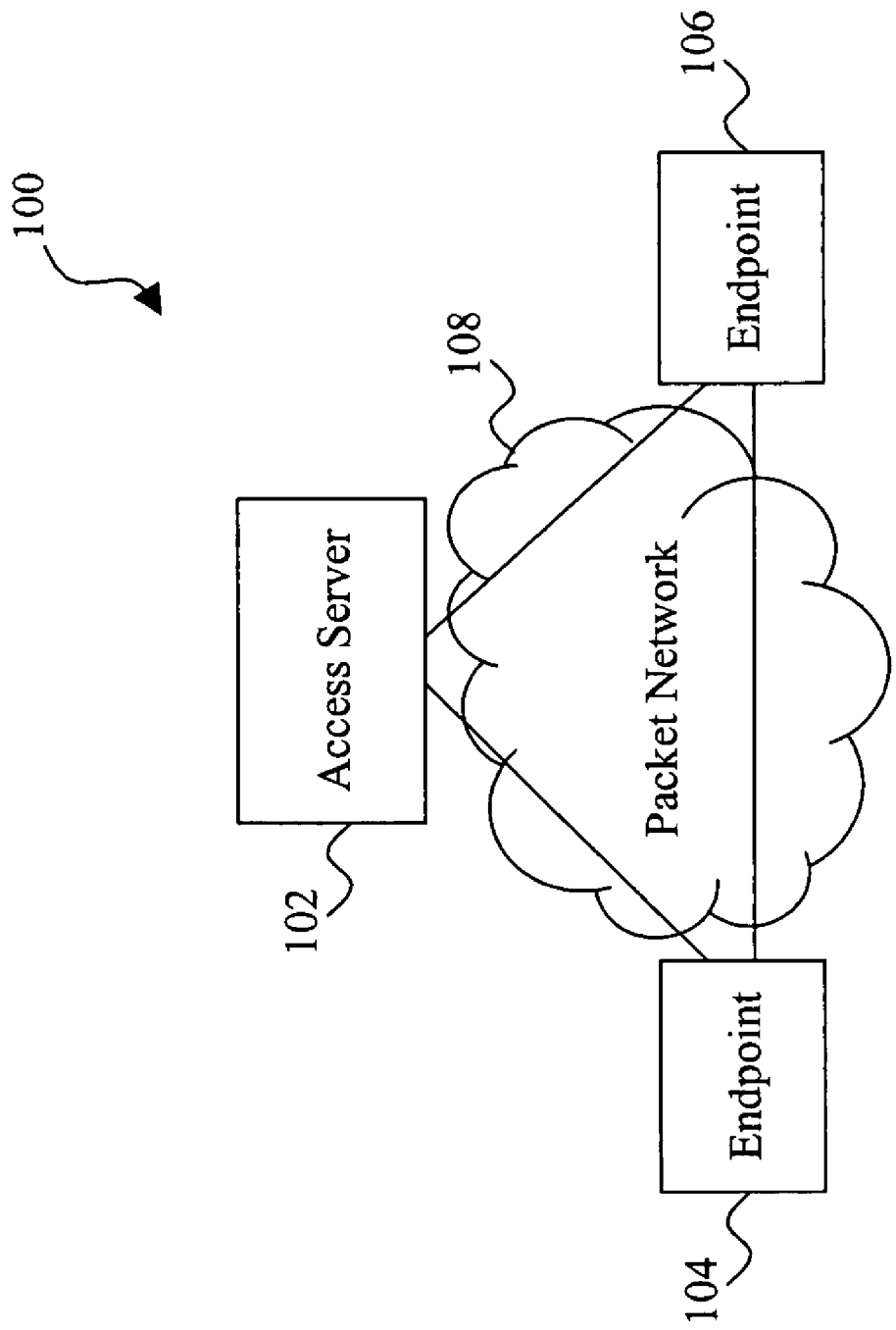
FIG. 1 is a simplified network diagram of one embodiment of a hybrid peer-to-peer system.

The present disclosure is directed to a system and method for peer-to-peer hybrid communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a peer-to-peer hybrid system 100 is illustrated. The system 100 includes an access server 102 that is coupled to endpoints 104 and 106 via a packet network 108. Communication between the access server 102, endpoint 104, and endpoint 106 is accomplished using predefined and publicly available (i.e., non-proprietary)

communication standards or protocols (e.g., those defined by the Internet Engineering Task Force (IETF) or the International Telecommunications Union-Telecommunications Standard Sector (ITU-T)). For example, signaling communications (e.g., session setup, management, and teardown) may use a protocol such as the Session Initiation Protocol (SIP), while actual data traffic may be communicated using a protocol such as the Real-time Transport Protocol (RTP). As will be seen in the following examples, the use of standard protocols for communication enables the endpoints 104 and 106 to communicate with any device that uses the same standards. The communications may include, but are not limited to, voice calls, instant messages, audio and video, emails, and any other type of resource transfer, where a resource represents any digital data. In the following description, media traffic is generally based on the user datagram protocol (UDP), while authentication is based on the transmission control protocol/internet protocol (TCP/IP). However, it is understood that these are used for purposes of example and that other protocols may be used in addition to or instead of UDP and TCP/IP.

Connections between the access server 102, endpoint 104, and endpoint 106 may include wireline and/or wireless communication channels. In the following description, it is understood that the term "direct" means that there is no endpoint or access server in the communication channel(s) between the endpoints 104 and 106, or between either endpoint and the access server. Accordingly, the access server 102, endpoint 104, and endpoint 106 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 102 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 4). The access server 102 provides the relevant profile information and routing table to each of the endpoints 104 and 106 so that the endpoints can communicate directly with one another. Accordingly, in the present embodiment, one function of the access server 102 is to serve as a storage location for information needed by an endpoint in order to communicate with other endpoints and as a temporary storage location for requests, voicemails, etc., as will be described later in greater detail.

Figure 2A:
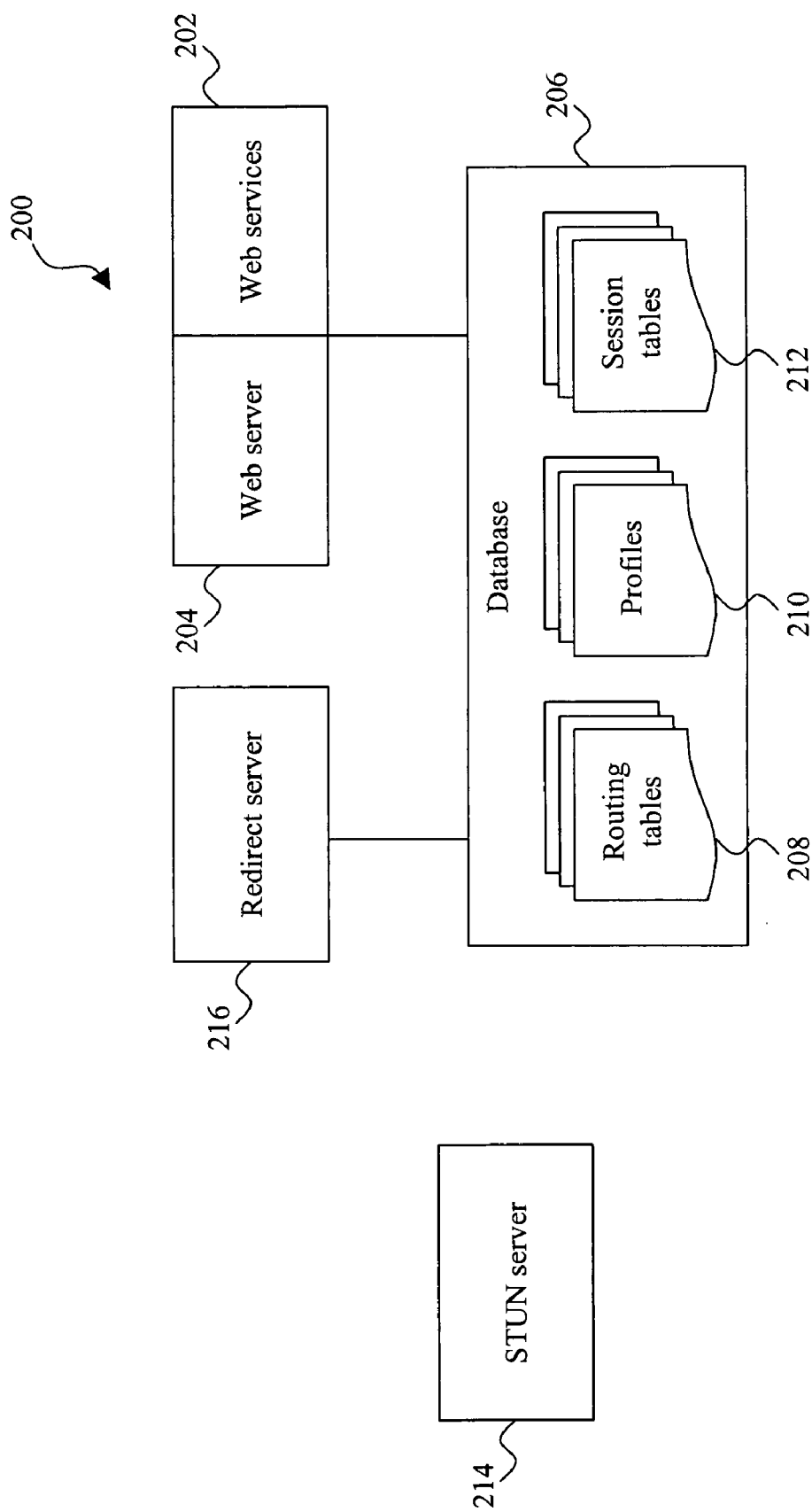
FIG. 2a illustrates one embodiment of an access server architecture that may be used within the system of FIG. 1.

With additional reference to FIG. 2a, one embodiment of an architecture 200 for the access server 102 of FIG. 1 is illustrated. The architecture 200 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 202 (e.g., based on functionality provided by XML, SOAP, NET, MONO), web server 204 (using, for example, Apache or IIS), and database 206 (using, for example, mySQL or SQLServer) for storing and retrieving routing tables 208, profiles 210, and one or more session tables 212. Functionality for a STUN (Simple Traversal of UDP through NATs (Network Address Translation)) server 214 is also present in the architecture 200. As is known, STUN is a protocol for assisting devices that are behind a NAT firewall or router with their packet routing. The architecture 200 may also include a redirect server 216 for handling requests originating outside of the system 100. One or both of the STUN server 214 and redirect server 216 may be incorporated into the access server 102 or may be a standalone device. In the present embodiment, both the server 204 and the redirect server 216 are coupled to the database 206.

Figure 2B:
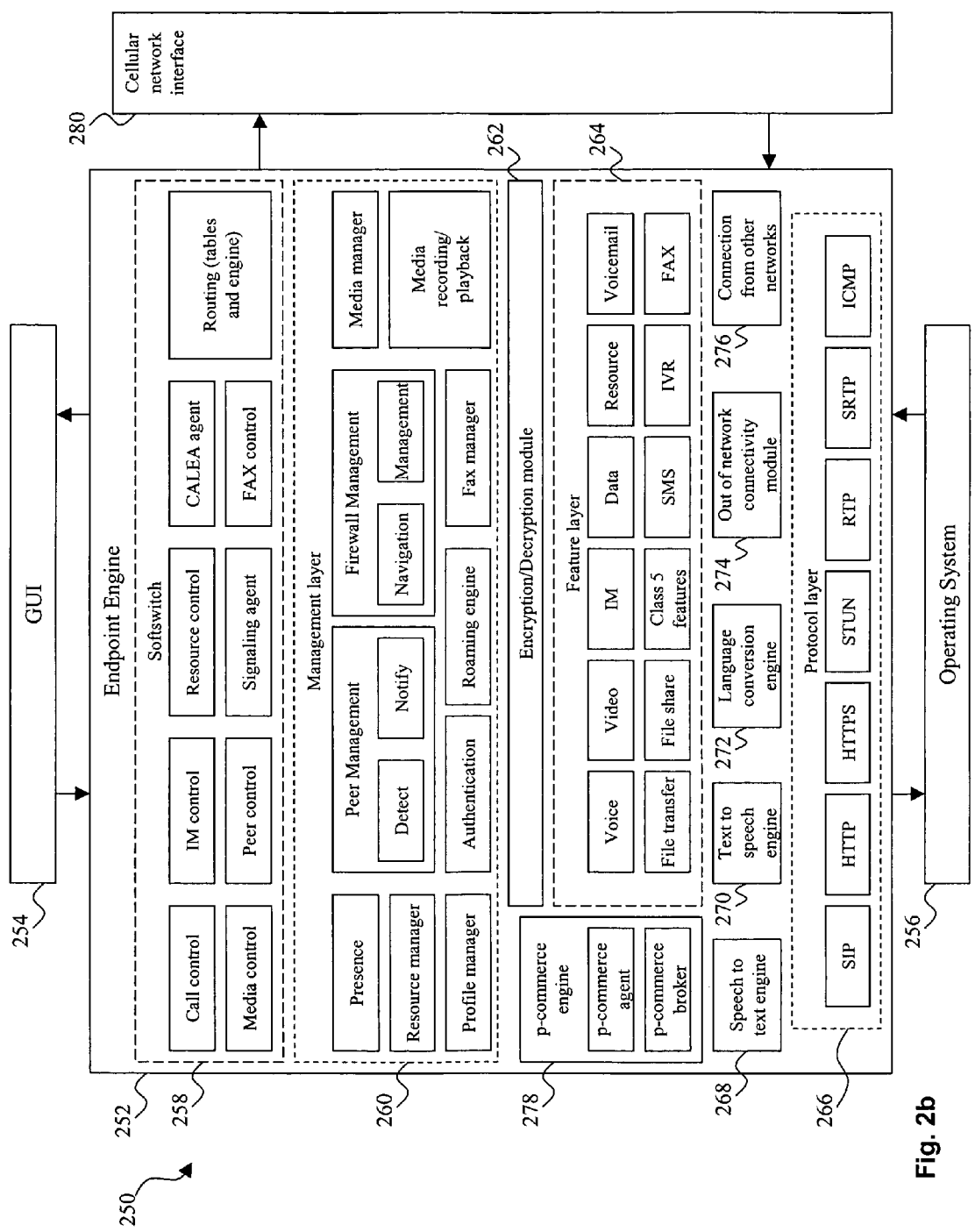
FIG. 2b illustrates one embodiment of an endpoint architecture that may be used within the system of FIG. 1.

Referring to FIG. 2b, one embodiment of an architecture 250 for the endpoint 104 (which may be similar or identical to the endpoint 106) of FIG. 1 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. The architecture 250 includes an endpoint engine 252 positioned between a graphical user interface (GUI) 254 and an operating system 256. The GUI 254 provides user access to the endpoint engine 252, while the operating system 256 provides underlying functionality, as is known to those of skill in the art.

The endpoint engine 252 may include multiple components and layers that support the functionality required to perform the operations of the endpoint 104. For example, the endpoint engine 252 includes a softswitch 258, a management layer 260, an encryption/decryption module 262, a feature layer 264, a protocol layer 266, a speech-to-text engine 268, a text-to-speech engine 270, a language conversion engine 272, an out-of-network connectivity module 274, a connection from other networks module 276, a p-commerce (e.g., peer commerce) engine 278 that includes a p-commerce agent and a p-commerce broker, and a cellular network interface module 280.

Each of these components/layers may be further divided into multiple modules. For example, the softswitch 258 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 260 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 262 provides encryption for outgoing packets and decryption for incoming packets. In the present example, the encryption/decryption module 262 provides application level encryption at the source, rather than at the network. However, it is understood that the encryption/decryption module 262 may provide encryption at the network in some embodiments.

The feature layer 264 provides support for various features such as voice, video, IM, data, voicemail, file transfer, file sharing, class 5 features, short message service (SMS), interactive voice response (IVR), faxes, and other resources. The protocol layer 266 includes protocols supported by the endpoint, including SIP, HTTP, HTTPS, STUN, RTP, SRTP, and ICMP. It is understood that these are examples only, and that fewer or more protocols may be supported.

The speech-to-text engine 268 converts speech received by the endpoint (e.g., via a microphone or network) into text, the text-to-speech engine 270 converts text received by the endpoint into speech (e.g., for output via a speaker), and the language conversion engine 272 may be configured to convert inbound or outbound information (text or speech) from one language to another language. The out-of-network connectivity module 274 may be used to handle connections between the endpoint and external devices (as described with respect to FIG. 12), and the connection from other networks module 276 handles incoming connection attempts from external devices. The cellular network interface module 280 may be used to interact with a wireless network.

Figure 2C:
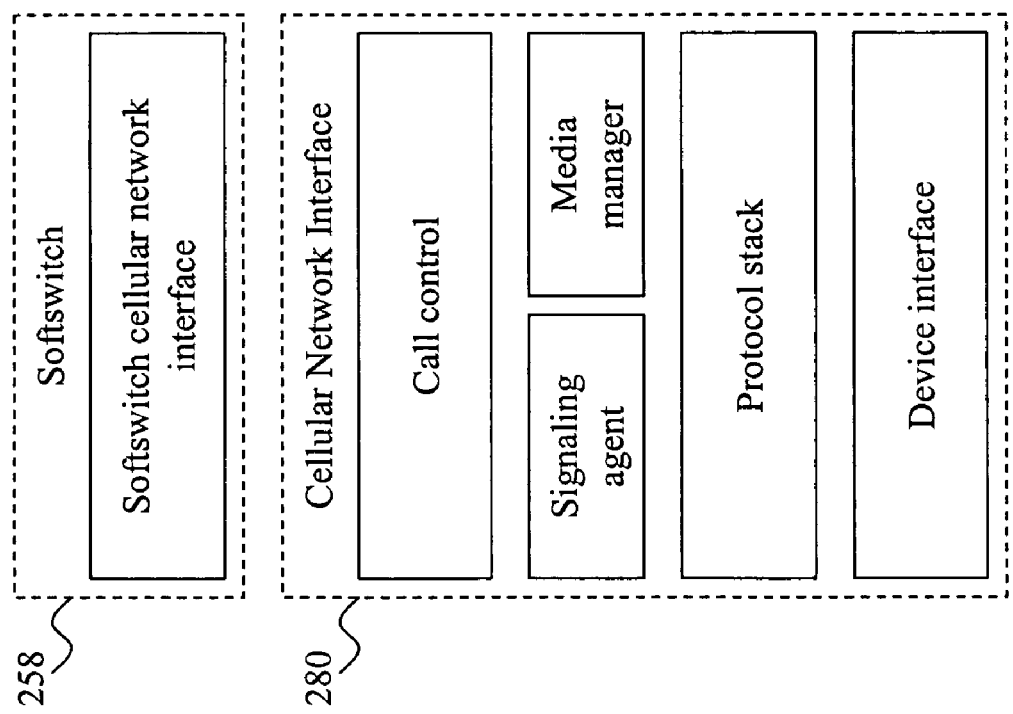
FIG. 2c illustrates one embodiment of components within the endpoint architecture of FIG. 2b that may be used for cellular network connectivity.

With additional reference to FIG. 2c, the cellular network interface module 280 is illustrated in greater detail. Although not shown in FIG. 2b, the softswitch 258 of the endpoint architecture 250 includes a cellular network interface for communication with the cellular network interface module 280. In addition, the cellular network interface module 280 includes various components such as a call control module, a signaling agent, a media manager, a protocol stack, and a device interface. It is noted that these components may correspond to layers within the endpoint architecture 250 and may be incorporated directly into the endpoint architecture in some embodiments.

Figure 2E:
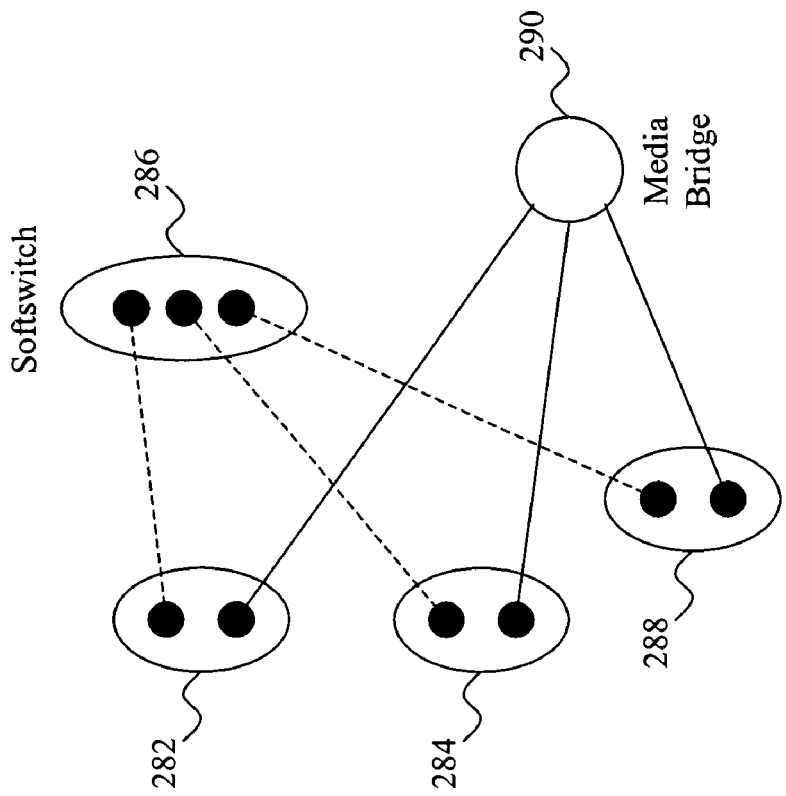
FIG. 2e illustrates a traditional softswitch configuration with three endpoints and a media bridge.
Figure 2D:
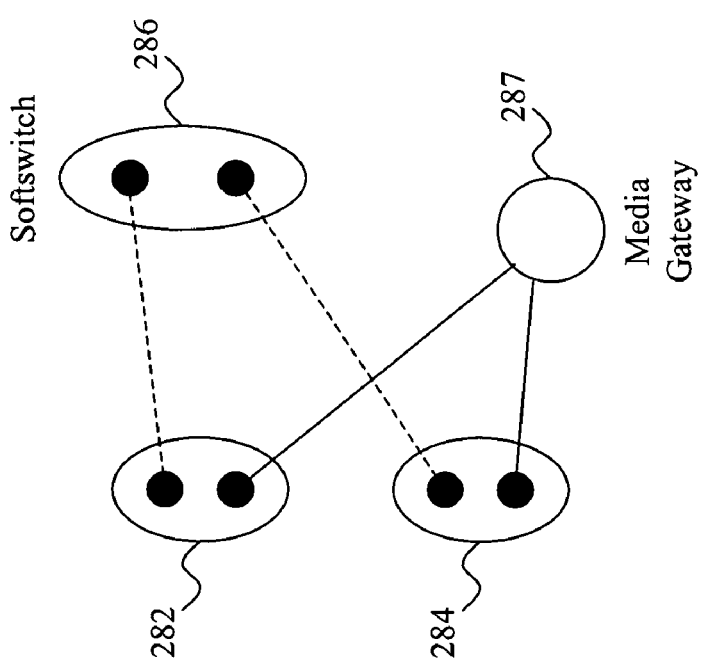
FIG. 2d illustrates a traditional softswitch configuration with two endpoints.

Referring to FIG. 2d, a traditional softswitch architecture is illustrated with two endpoints 282 and 284, neither of which includes a softswitch. In the present example, an external softswitch 286 maintains a first signaling leg (dotted line) with the endpoint 282 and a second signaling leg (dotted line) with the endpoint 284. The softswitch 286 links the two legs to pass signaling information between the endpoints 282 and 284. Media traffic (solid lines) may be transferred between the endpoints 282 and 284 via a media gateway 287.

With additional reference to FIG. 2e, the traditional softswitch architecture of FIG. 2d is illustrated with a third endpoint 288 that also does not include a softswitch. The external softswitch 286 now maintains a third signaling leg (dotted line) with the endpoint 288. In the present example, a conference call is underway. However, as none of the endpoints includes a softswitch, a media bridge 290 connected to each endpoint is needed for media traffic. Accordingly, each endpoint has at most two concurrent connections—one with the softswitch for signaling and another with the media bridge for media traffic.

Figure 2G:
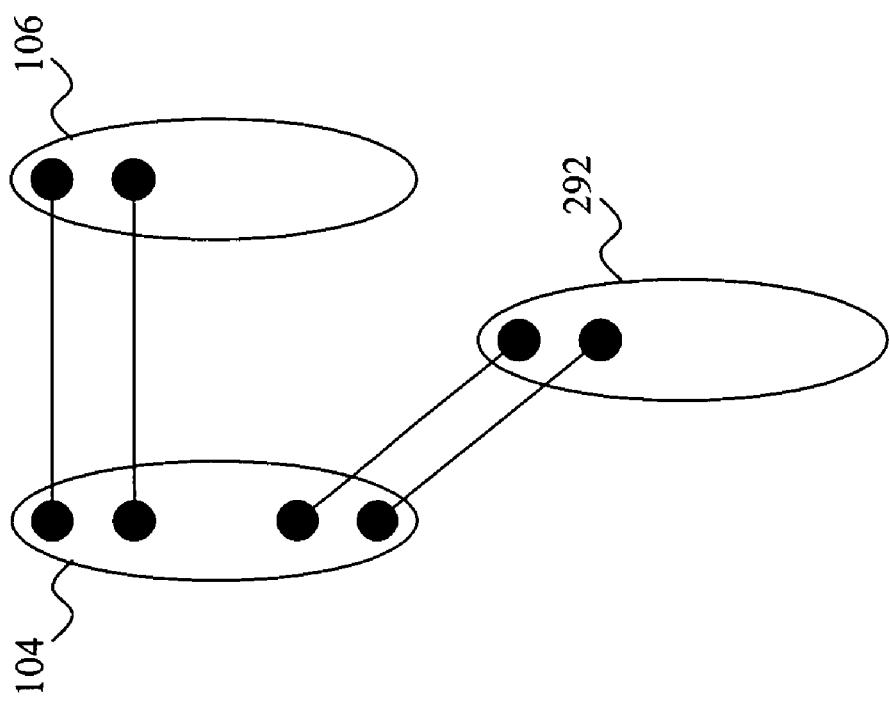
FIG. 2g illustrates one embodiment of the present disclosure with three endpoints, each of which includes a softswitch.
Figure 2F:
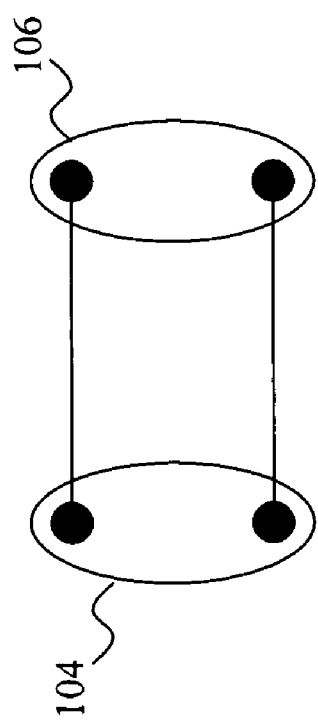
FIG. 2f illustrates one embodiment of the present disclosure with two endpoints, each of which includes a softswitch.

Referring to FIG. 2f, in one embodiment, unlike the traditional architecture of FIGS. 2d and 2e, two endpoints (e.g., the endpoints 104 and 106 of FIG. 1) each include a softswitch (e.g., the softswitch 258 of FIG. 2b). Each endpoint is able to establish and maintain both signaling and media traffic connections (both virtual and physical legs) with the other endpoint. Accordingly, no external softswitch is needed, as this model uses a distributed softswitch method to handle communications directly between the endpoints.

With additional reference to FIG. 2g, the endpoints 104 and 106 are illustrated with another endpoint 292 that also contains a softswitch. In this example, a conference call is underway with the endpoint 104 acting as the host. To accomplish this, the softswitch contained in the endpoint 104 enables the endpoint 104 to support direct signaling and media traffic connections with the endpoint 292. The endpoint 104 can then forward media traffic from the endpoint 106 to the endpoint 292 and vice versa. Accordingly, the endpoint 104 may support multiple connections to multiple endpoints and, as in FIG. 2f, no external softswitch is needed.

Referring again to FIG. 2b, in operation, the softswitch 258 uses functionality provided by underlying layers to handle connections with other endpoints and the access server 102, and to handle services needed by the endpoint 104. For example, as is described below in greater detail with respect to FIGS. 3a and 3b, incoming and outgoing calls may utilize multiple components within the endpoint architecture 250.

Figure 3A:
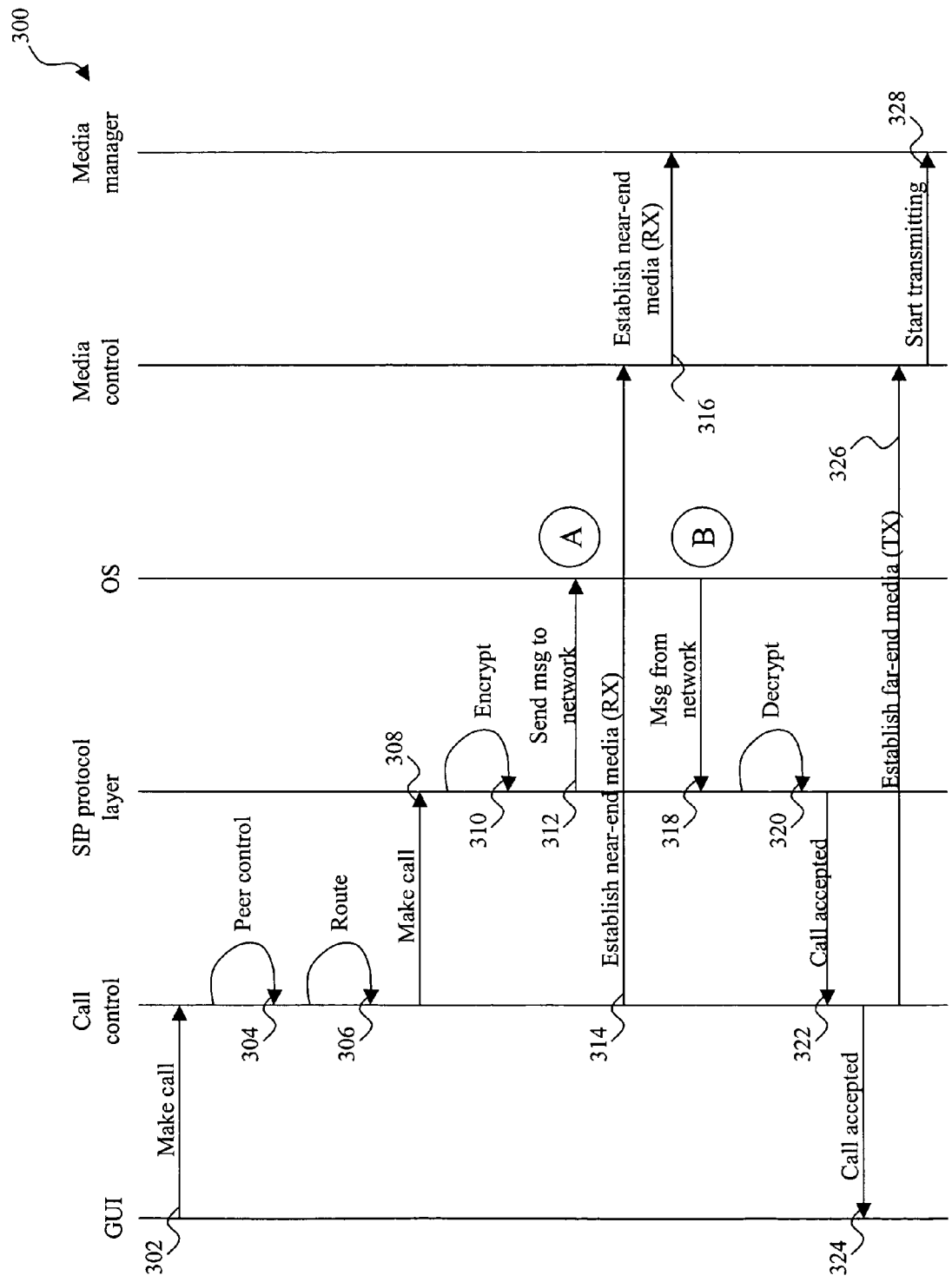
FIG. 3a is a sequence diagram illustrating the interaction of various components of FIG. 2b when placing a call.

Referring to FIG. 3a, a sequence diagram 300 illustrates an exemplary process by which the endpoint 104 may initiate a call to the endpoint 106 using various components of the architecture 250. Prior to step 302, a user (not shown) initiates a call via the GUI 254. In step 302, the GUI 254 passes a message to the call control module (of the softswitch 258) to make the call. The call control module contacts the peer control module (softswitch 258) in step 304, which detects the peer (if not already done), goes to the routing table (softswitch 258) for the routing information, and performs similar operations. It is understood that not all interactions are illustrated. For example, the peer control module may utilize the peer management module (of the management layer 260) for the peer detection. The call control module then identifies a route for the call in step 306, and sends message to the SIP protocol layer (of the protocol layer 266) to make the call in step 308. In step 310, the outbound message is encrypted (using the encryption/decryption module 262) and the message is sent to the network via the OS 256 in step 312.

After the message is sent and prior to receiving a response, the call control module instructs the media control module (softswitch 258) to establish the needed near-end media in step 314. The media control module passes the instruction to the media manager (of the management layer 260) in step 316, which handles the establishment of the near-end media.

Figure 3B:
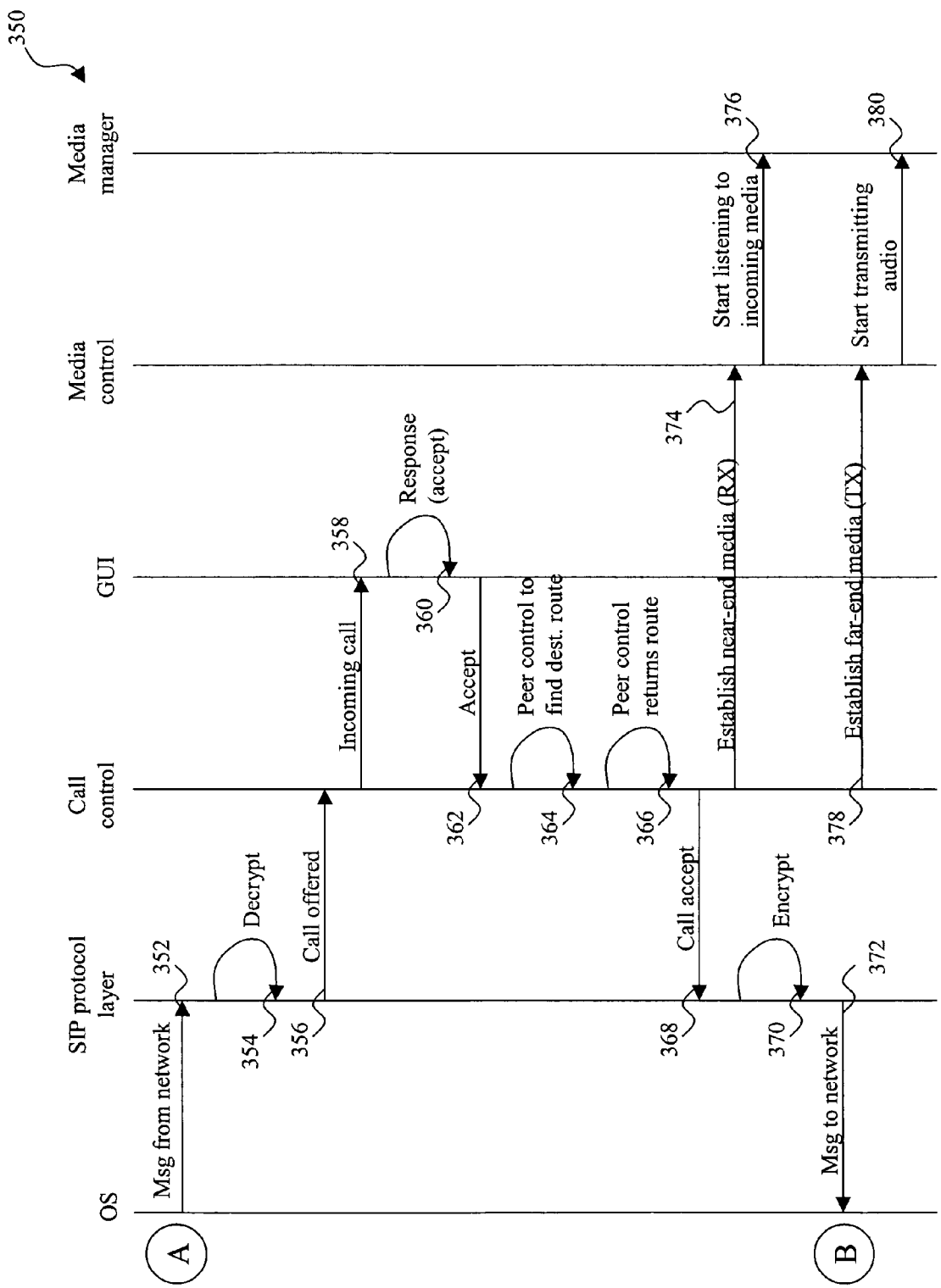
FIG. 3b is a sequence diagram illustrating the interaction of various components of FIG. 2b when receiving a call.

With additional reference to FIG. 3b, the message sent by the endpoint 104 in step 312 (FIG. 3a) is received by the endpoint 106 and passed from the OS to the SIP protocol layer in step 352. The message is decrypted in step 354 and the call is offered to the call control module in step 356. The call control module notifies the GUI of an incoming call in step 358 and the GUI receives input identifying whether the call is accepted or rejected (e.g., by a user) in step 360. In the present example, the call is accepted and the GUI passes the acceptance to the call control module in step 362. The call control module contacts the peer control module in step 364, which identifies a route to the calling endpoint and returns the route to the call control module in step 366. In steps 368 and 370, the call control module informs the SIP protocol layer that the call has been accepted and the message is encrypted using the encryption/decryption module. The acceptance message is then sent to the network via the OS in step 372.

In the present example, after the call control module passes the acceptance message to the SIP protocol layer, other steps may occur to prepare the endpoint 106 for the call. For example, the call control module instructs the media control module to establish near-end media in step 374, and the media control module instructs the media manager to start listening to incoming media in step 376. The call control module also instructs the media control module to establish far-end media (step 378), and the media control module instructs the media manager to start transmitting audio in step 380.

Returning to FIG. 3a, the message sent by the endpoint 106 (step 372) is received by the OS and passed on to the SIP protocol layer in step 318 and decrypted in step 320. The message (indicating that the call has been accepted) is passed to the call control module in step 322 and from there to the GUI in step 324. The call control module then instructs the media control module to establish far-end media in step 326, and the media control module instructs the media manager to start transmitting audio in step 328.

The following figures are sequence diagrams that illustrate various exemplary functions and operations by which the access server 102 and the endpoints 104 and 106 may communicate. It is understood that these diagrams are not exhaustive and that various steps may be excluded from the diagrams to clarify the aspect being described.

Figure 4:
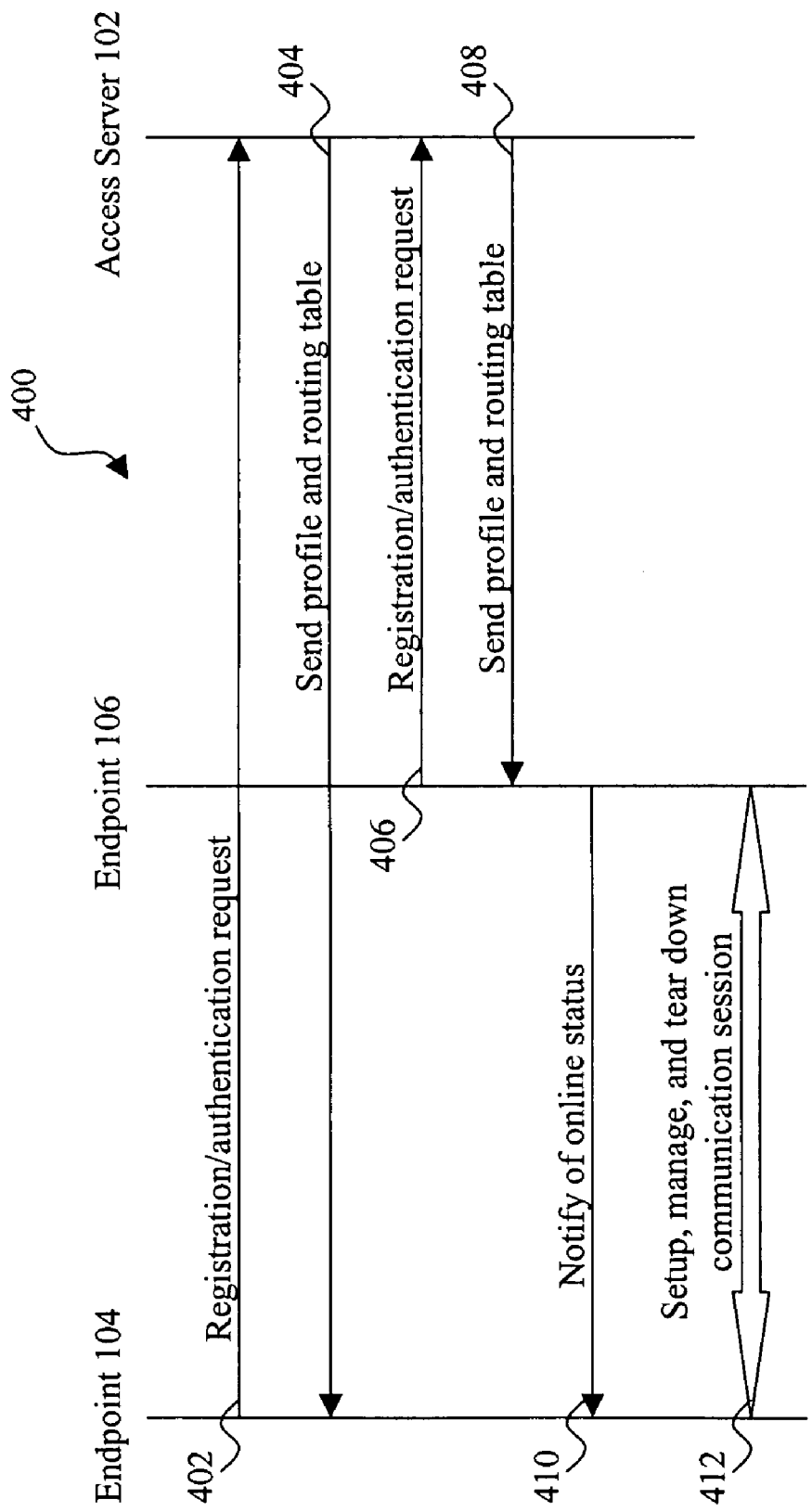
FIG. 4 is a sequence diagram illustrating an exemplary process by which an endpoint of FIG. 1 may be authenticated and communicate with another endpoint.

Referring to FIG. 4 (and using the endpoint 104 as an example), a sequence diagram 400 illustrates an exemplary process by which the endpoint 104 may authenticate with the access server 102 and then communicate with the endpoint 106. As will be described, after authentication, all communication (both signaling and media traffic) between the endpoints 104 and 106 occurs directly without any intervention by the access server 102. In the present example, it is understood that neither endpoint is online at the beginning of the sequence, and that the endpoints 104 and 106 are "buddies." As described above, buddies are endpoints that have both previously agreed to communicate with one another.

In step 402, the endpoint 104 sends a registration and/or authentication request message to the access server 102. If the endpoint 104 is not registered with the access server 102, the access server will receive the registration request (e.g., user ID, password, and email address) and will create a profile for the endpoint (not shown). The user ID and password will then be used to authenticate the endpoint 104 during later logins. It is understood that the user ID and password may enable the user to authenticate from any endpoint, rather than only the endpoint 104.

Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is currently offline, the buddy list will reflect this status. The access server 102 then sends the profile information (e.g., the buddy list) and a routing table to the endpoint 104 in step 404. The routing table contains address information for online members of the buddy list. It is understood that steps 402 and 404 represent a make and break connection that is broken after the endpoint 104 receives the profile information and routing table.

In steps 406 and 408, the endpoint 106 and access server 102 repeat steps 402 and 404 as described for the endpoint 104. However, because the endpoint 104 is online when the endpoint 106 is authenticated, the profile information sent to the endpoint 106 will reflect the online status of the endpoint 104 and the routing table will identify how to directly contact it. Accordingly, in step 410, the endpoint 106 sends a message directly to the endpoint 104 to notify the endpoint 104 that the endpoint 106 is now online. This also provides the endpoint 104 with the address information needed to communicate directly with the endpoint 106. In step 412, one or more communication sessions may be established directly between the endpoints 104 and 106.

Figure 5:
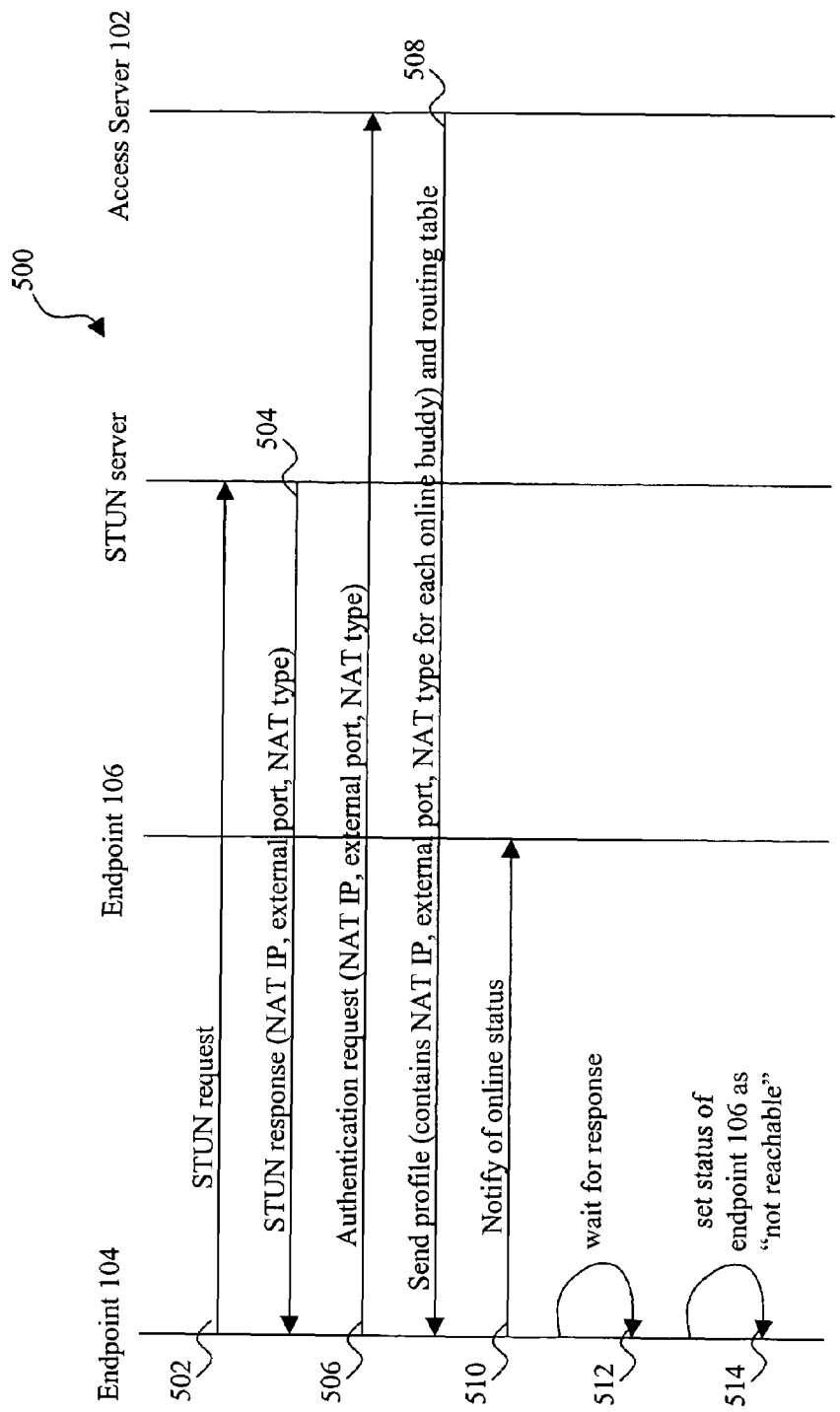
FIG. 5 is a sequence diagram illustrating an exemplary process by which an endpoint of FIG. 1 may determine the status of another endpoint.

Referring to FIG. 5, a sequence diagram 500 illustrates an exemplary process by which authentication of an endpoint (e.g., the endpoint 104) may occur. In addition, after authentication, the endpoint 104 may determine whether it can communicate with the endpoint 106. In the present example, the endpoint 106 is online when the sequence begins.

In step 502, the endpoint 104 sends a request to the STUN server 214 of FIG. 2. As is known, the STUN server determines an outbound IP address (e.g., the external address of a device (i.e., a firewall, router, etc.) behind which the endpoint 104 is located), an external port, and a type of NAT used by the device. The type of NAT may be, for example, full cone, restricted cone, port restricted cone, or symmetric. As these are known in the art, they will not be described herein in greater detail. The STUN server 214 sends a STUN response back to the endpoint 104 in step 504 with the collected information about the endpoint 104.

In step 506, the endpoint 104 sends an authentication request to the access server 102. The request contains the information about endpoint 104 received from the STUN server 214. In step 508, the access server 102 responds to the request by sending the relevant profile and routing table to the endpoint 104. The profile contains the external IP address, port, and NAT type for each of the buddies that are online.

In step 510, the endpoint 104 sends a message to notify the endpoint 106 of its online status (as the endpoint 106 is already online) and, in step 512, the endpoint 104 waits for a response. After the expiration of a timeout period within which no response is received from the endpoint 106, the endpoint 104 will change the status of the endpoint 106 from "online" (as indicated by the downloaded profile information) to "unreachable." The status of a buddy may be indicated on a visual buddy list by the color of an icon associated with each buddy. For example, when logging in, online buddies may be denoted by a blue icon and offline buddies may be denoted by a red icon. If a response to a notify message is received for a buddy, the icon representing that buddy may be changed from blue to green to denote the buddy's online status. If no response is received, the icon remains blue to indicate that the buddy is unreachable. Although not shown, a message sent from the endpoint 106 and received by the endpoint 104 after step 514 would indicate that the endpoint 106 is now reachable and would cause the endpoint 104 to change the status of the endpoint 106 to online. Similarly, if the endpoint 104 later sends a message to the endpoint 106 and receives a response, then the endpoint 104 would change the status of the endpoint 106 to online.

It is understood that other embodiments may implement alternate NAT traversal techniques. For example, a single payload technique may be used in which TCP/IP packets are used to traverse a UDP restricted firewall or router. Another example includes the use of a double payload in which a UDP packet is inserted into a TCP/IP packet. Furthermore, it is understood that protocols other than STUN may be used. For example, protocols such as Internet Connectivity Establishment (ICE) or Traversal Using Relay NAT (TURN) may be used.

Figure 6:
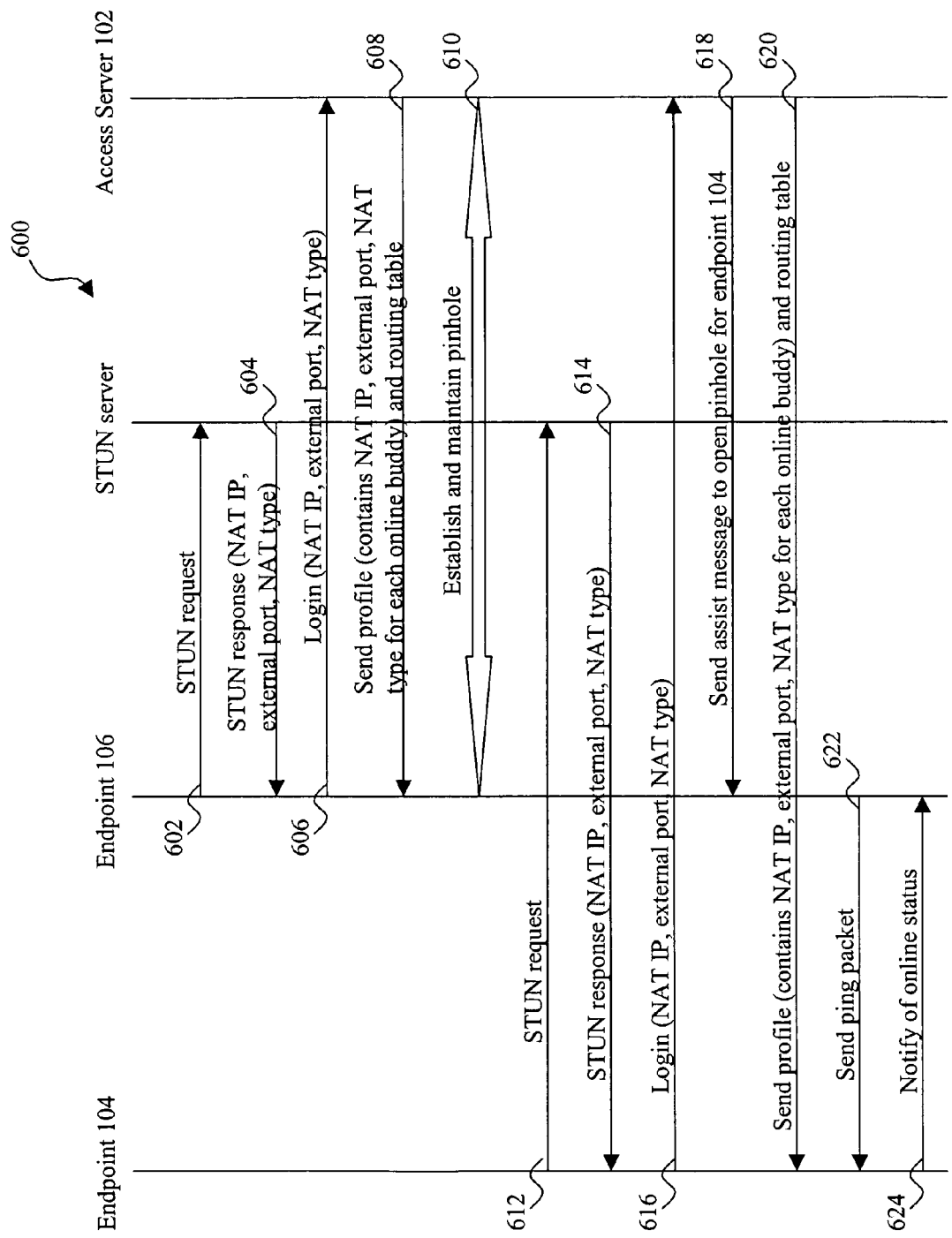
FIG. 6 is a sequence diagram illustrating an exemplary process by which an access server of FIG. 1 may aid an endpoint in establishing communications with another endpoint.

Referring to FIG. 6, a sequence diagram 600 illustrates an exemplary process by which the access server 102 may aid the endpoint 104 in establishing communications with the endpoint 106 (which is a buddy). After rendering aid, the access server 102 is no longer involved and the endpoints may communicate directly. In the present example, the endpoint 106 is behind a NAT device that will only let a message in (towards the endpoint 106) if the endpoint 106 has sent a message out. Unless this process is bypassed, the endpoint 104 will be unable to connect to the endpoint 106. For example, the endpoint 104 will be unable to notify the endpoint 106 that it is now online.

In step 602, the endpoint 106 sends a request to the STUN server 214 of FIG. 2. As described previously, the STUN server determines an outbound IP address, an external port, and a type of NAT for the endpoint 106. The STUN server 214 sends a STUN response back to the endpoint 106 in step 604 with the collected information about the endpoint 106. In step 606, the endpoint 106 sends an authentication request to the access server 102. The request contains the information about endpoint 106 received from the STUN server 214. In step 608, the access server 102 responds to the request by sending the relevant profile and routing table to the endpoint 106. In the present example, the access server 102 identifies the NAT type associated with the endpoint 106 as being a type that requires an outbound packet to be sent before an inbound packet is allowed to enter. Accordingly, the access server 102 instructs the endpoint 106 to send periodic messages to the access server 102 to establish and maintain a pinhole through the NAT device. For example, the endpoint 106 may send a message prior to the timeout period of the NAT device in order to reset the timeout period. In this manner, the pinhole may be kept open indefinitely.

In steps 612 and 614, the endpoint 104 sends a STUN request to the STUN server 214 and the STUN server responds as previously described. In step 616, the endpoint 104 sends an authentication request to the access server 102. The access server 102 retrieves the buddy list for the endpoint 104 and identifies the endpoint 106 as being associated with a NAT type that will block communications from the endpoint 104. Accordingly, in step 618, the access server 102 sends an assist message to the endpoint 106. The assist message instructs the endpoint 106 to send a message to the endpoint 104, which opens a pinhole in the NAT device for the endpoint 104. For security purposes, as the access server 102 has the STUN information for the endpoint 104, the pinhole opened by the endpoint 106 may be specifically limited to the endpoint associated with the STUN information. Furthermore, the access server 102 may not request such a pinhole for an endpoint that is not on the buddy list of the endpoint 106.

The access server 104 sends the profile and routing table to the endpoint 104 in step 620. In step 622, the endpoint 106 sends a message (e.g., a ping packet) to the endpoint 104. The endpoint 104 may then respond to the message and notify the endpoint 106 that it is now online. If the endpoint 106 does not receive a reply from the endpoint 104 within a predefined period of time, it may close the pinhole (which may occur simply by not sending another message and letting the pinhole time out). Accordingly, the difficulty presented by the NAT device may be overcome using the assist message, and communications between the two endpoints may then occur without intervention by the access server 102.

Figure 7:
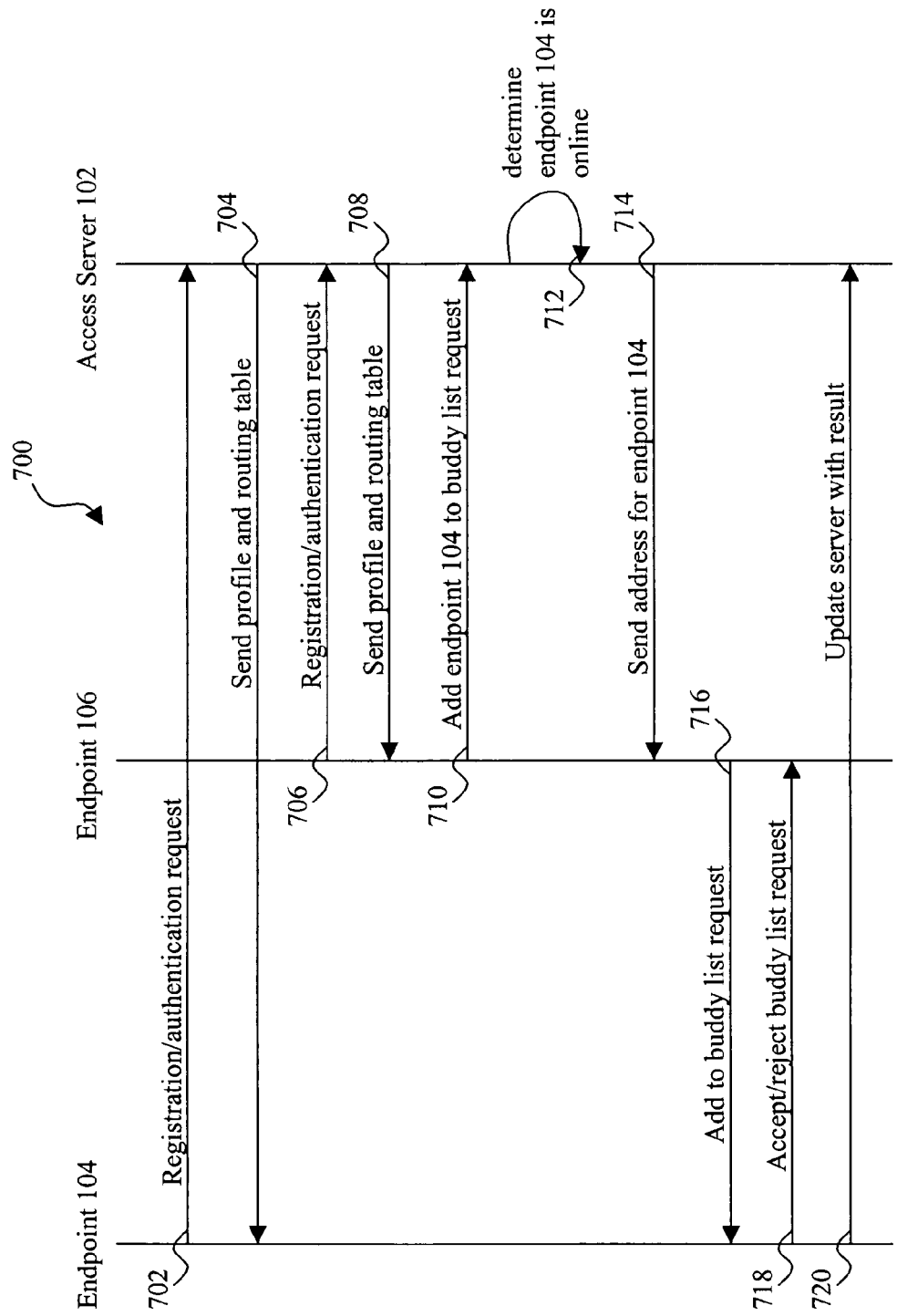
FIG. 7 is a sequence diagram illustrating an exemplary process by which an endpoint of FIG. 1 may request that it be added to the buddy list of another endpoint that is currently online.

Referring to FIG. 7, a sequence diagram 700 illustrates an exemplary process by which the endpoint 106 may request that it be added to the endpoint 104's buddy list. In the present example, the endpoints 104 and 106 both remain online during the entire process.

In step 702, the endpoint 104 sends a registration and/or authentication request message to the access server 102 as described previously. Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is not currently on the buddy list, it will not be present. The access server 102 then sends the profile information and a routing table to the endpoint 104 in step 704.

In steps 706 and 708, the endpoint 106 and access server 102 repeat steps 702 and 704 as described for the endpoint 104. The profile information sent by the access server 102 to the endpoint 106 will not include the endpoint 104 because the two endpoints are not buddies.

In step 710, the endpoint 106 sends a message to the access server 102 requesting that the endpoint 104 be added to its buddy list. The access server 102 determines that the endpoint 104 is online (e.g., using the session table) in step 712 and sends the address for the endpoint 104 to the endpoint 106 in step 714. In step 716, the endpoint 106 sends a message directly to the endpoint 104 requesting that the endpoint 106 be added to its buddy list. The endpoint 104 responds to the endpoint 106 in step 718 with either permission or a denial, and the endpoint 104 also updates the access server 102 with the response in step 720. For example, if the response grants permission, then the endpoint 104 informs the access server 102 so that the access server can modify the profile of both endpoints to reflect the new relationship. It is understood that various other actions may be taken. For example, if the endpoint 104 denies the request, then the access server 102 may not respond to another request by the endpoint 106 (with respect to the endpoint 104) until a period of time has elapsed.

It is understood that many different operations may be performed with respect to a buddy list. For example, buddies may be deleted, blocked/unblocked, buddy status may be updated, and a buddy profile may be updated. For block/unblock, as well as status and profile updates, a message is first sent to the access server 102 by the endpoint requesting the action (e.g., the endpoint 104). Following the access server 102 update, the endpoint 104 sends a message to the peer being affected by the action (e.g., the endpoint 106).

Buddy deletion may be handled as follows. If the user of the endpoint 104 wants to delete a contact on a buddy list currently associated with the online endpoint 106, the endpoint 104 will first notify the access server 102 that the buddy is being deleted. The access server 102 then updates the profile of both users so that neither buddy list shows the other user as a buddy. Note that, in this instance, a unilateral action by one user will alter the profile of the other user. The endpoint 104 then sends a message directly to the endpoint 106 to remove the buddy (the user of the endpoint 104) from the buddy list of the user of endpoint 106 in real time. Accordingly, even though the user is online at endpoint 106, the user of the endpoint 104 will be removed from the buddy list of the endpoint 106

Figure 8:
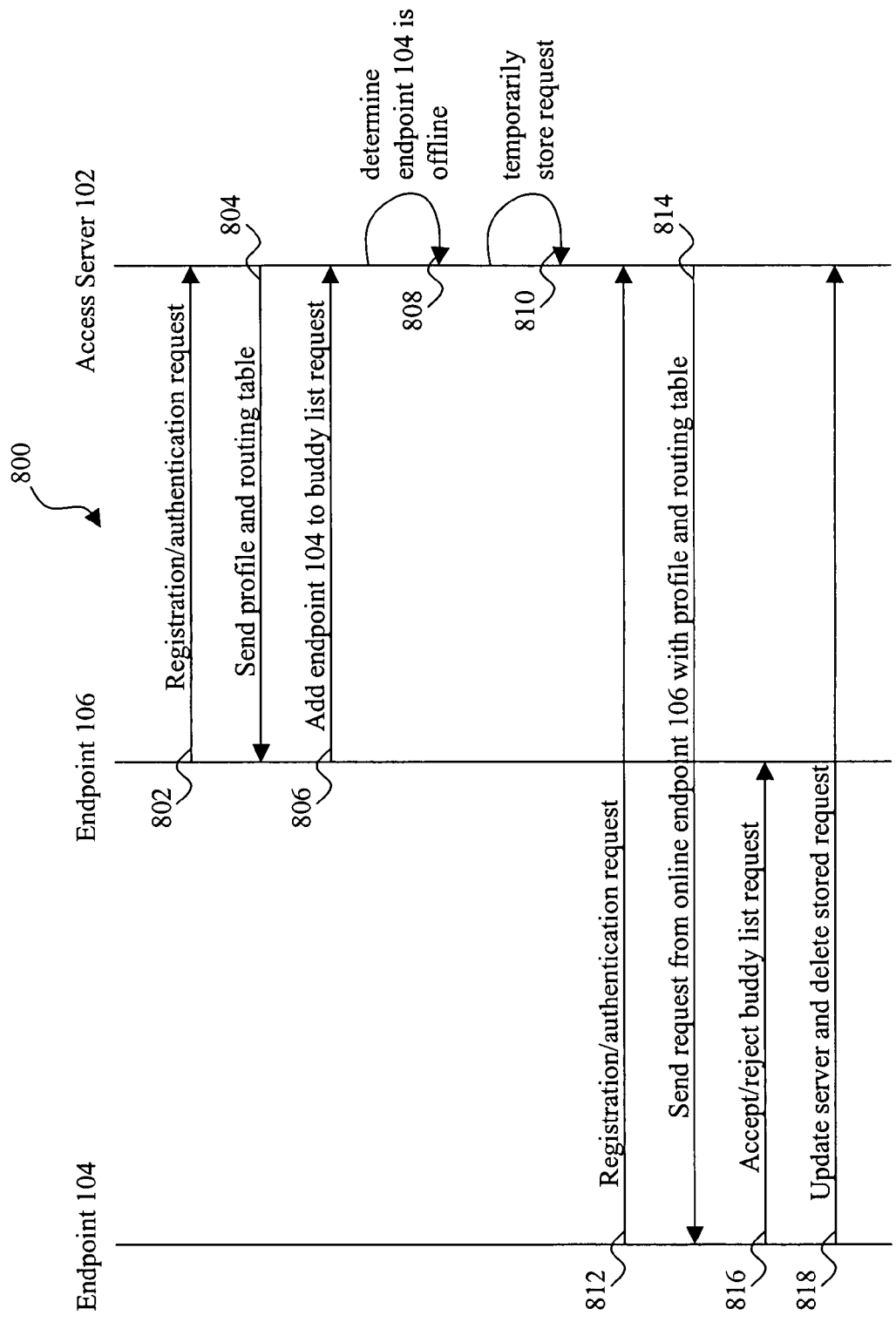
FIG. 8 is a sequence diagram illustrating an exemplary process by which an endpoint of FIG. 1 may request that it be added to the buddy list of another endpoint that is currently offline.

Referring to FIG. 8, a sequence diagram 800 illustrates an exemplary process by which the endpoint 106 may request that it be added to the endpoint 104's buddy list. In the present example, the endpoint 104 is not online until after the endpoint 106 has made its request.

In step 802, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 804.

In step 806, the endpoint 106 sends a message to the access server 102 requesting that the endpoint 104 be added to its buddy list. The access server 102 determines that the endpoint 104 is offline in step 808 and temporarily stores the request message in step 810. In steps 812 and 814, the endpoint 104 and access server 102 repeat steps 802 and 804 as described for the endpoint 106. However, when the access server 102 sends the profile information and routing table to the endpoint 104, it also sends the request by the endpoint 106 (including address information for the endpoint 106).

In step 816, the endpoint 104 responds directly to the endpoint 106 with either permission or a denial. The endpoint 104 then updates the access server 102 with the result of the response in step 818 and also instructs the access server to delete the temporarily stored request.

Figure 9:
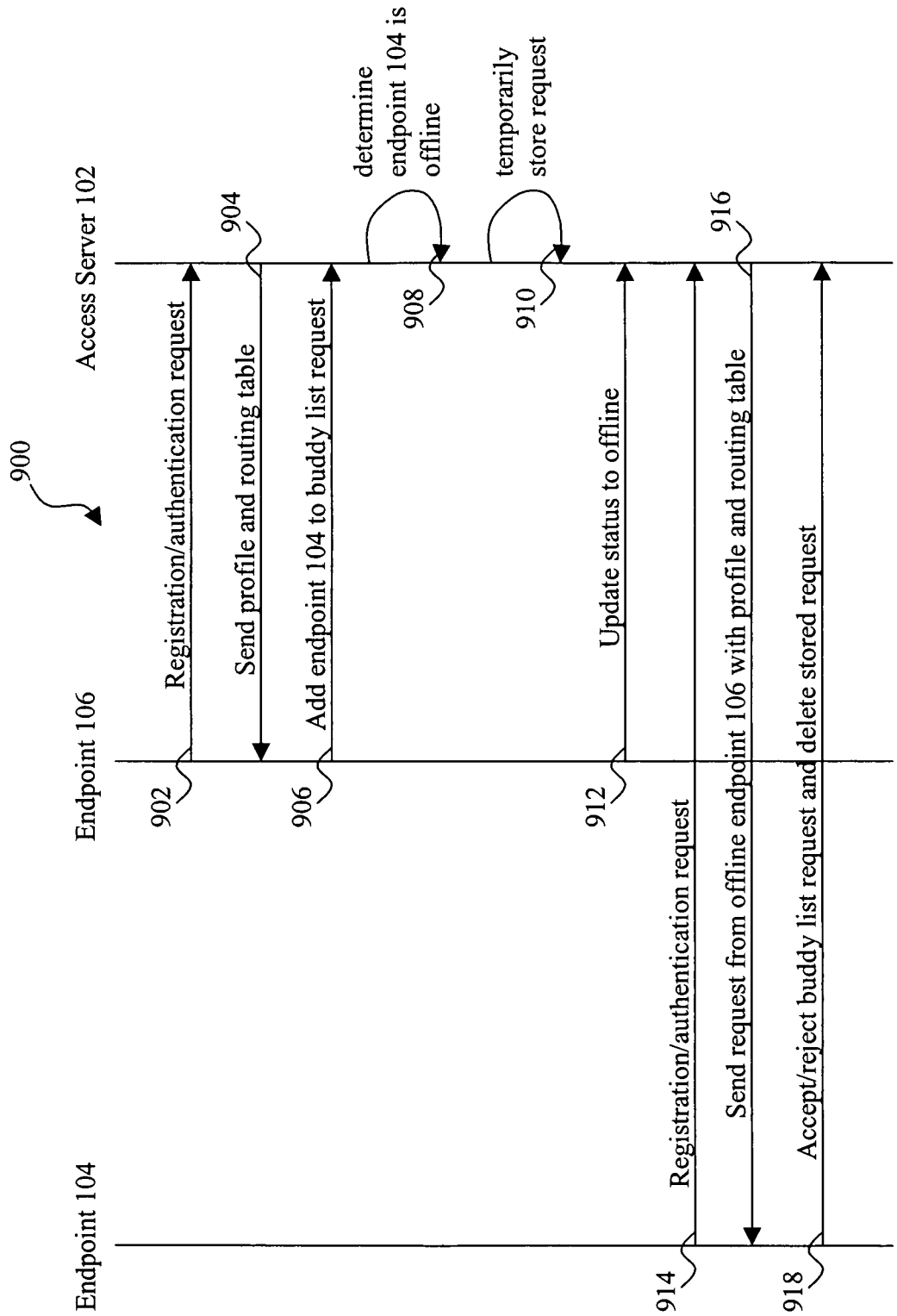
FIG. 9 is a sequence diagram illustrating an exemplary process by which an endpoint of FIG. 1 may request that it be added to the buddy list of another endpoint that is currently offline before it too goes offline.

Referring to FIG. 9, a sequence diagram 900 illustrates an exemplary process by which the endpoint 106 may request that it be added to the endpoint 104's buddy list. In the present example, the endpoint 104 is not online until after the endpoint 106 has made its request, and the endpoint 106 is not online to receive the response by endpoint 104.

In step 902, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 904.

In step 906, the endpoint 106 sends a message to the access server 102 requesting that the endpoint 104 be added to its buddy list. The access server 102 determines that the endpoint 104 is offline in step 908 and temporarily stores the request message in step 910. In step 912, the endpoint 106 notifies the access server 102 that it is going offline.

In steps 914 and 916, the endpoint 104 and access server 102 repeat steps 902 and 904 as described for the endpoint 106. However, when the access server 102 sends the profile information and routing table to the endpoint 104, it also sends the request by the endpoint 106. Endpoint 104 sends its response to the access server 102 in step 918 and also instructs the access server to delete the temporarily stored request. After the endpoint 106's next authentication process, its profile information will include endpoint 104 as a buddy (assuming the endpoint 104 granted permission).

Figure 10:
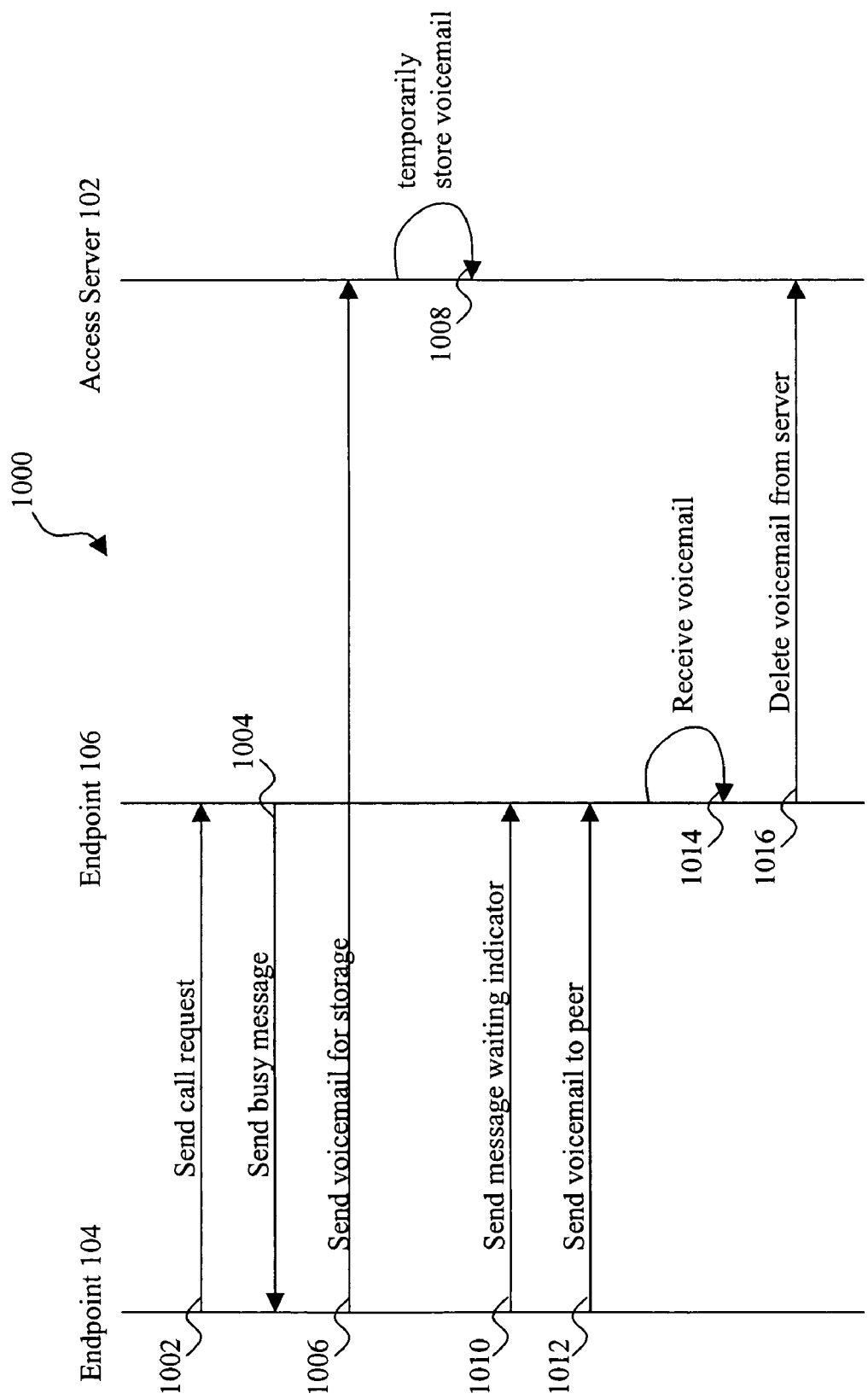
FIG. 10 is a sequence diagram illustrating an exemplary process by which an endpoint of FIG. 1 may send a voicemail to another endpoint that is online.

Referring to FIG. 10, a sequence diagram 1000 illustrates an exemplary process by which the endpoint 106 may store a voicemail for the endpoint 104. In the present example, the endpoint 106 is online, but is not available to take the call.

In step 1002, the endpoint 104 sends a call request message to the endpoint 106 requesting that a call be established between the two endpoints. In step 1004, the endpoint 106 responds with a message indicating that it is busy and cannot take the call. In step 1006, after recording a voicemail (not shown), the endpoint 104 sends the voicemail to the access server 102, which temporarily stores the voicemail in step 1008. The endpoint 104 then sends a message (e.g., a message waiting indicator (MWI)) to the endpoint 106 in step 1010 before sending the voicemail to the endpoint 106 in step 1012. The endpoint 106 receives the voicemail in step 1014 (e.g., after ending the previous call) and instructs the access server 102 to delete the temporarily stored voicemail in step 1016. It is understood that the endpoint 106 may perform many different actions with respect to the voicemail, including saving, forwarding, responding, etc.

Figure 11:
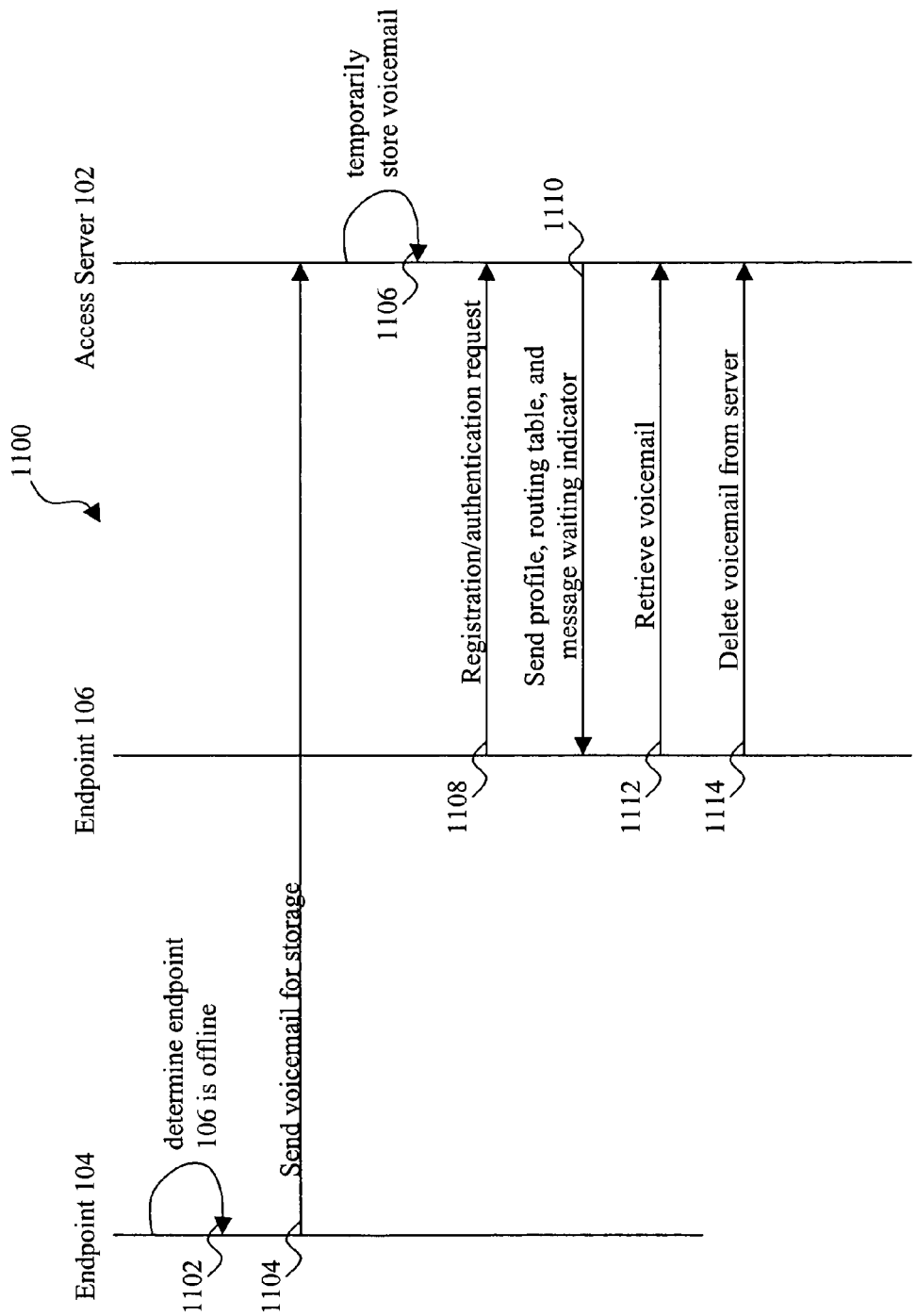
FIG. 11 is a sequence diagram illustrating an exemplary process by which an endpoint of FIG. 1 may send a voicemail to another endpoint that is offline.

Referring to FIG. 11, a sequence diagram 1100 illustrates an exemplary process by which the endpoint 106 may receive a voicemail from the endpoint 104. In the present example, the endpoint 106 is offline when the voicemail is recorded and sent. In step 1102, the endpoint 104 determines that the endpoint 106 is offline. As described previously, such a determination may be made based on the fact that the endpoint 106 was not online when the endpoint 104 was authenticated (as indicated by the profile information from the access server 102) and has not since logged in (as it would have notified the endpoint 104 as described with respect to FIG. 4). As the endpoint 106 is offline, the endpoint 104 sends a recorded voicemail to the access server 102 in step 1104, which temporarily stores the voicemail in step 1106. The endpoint 106 authenticates with the access server 102 in step 1108 as previously described, and the access server sends the endpoint 106 the relevant profile information and routing table in step 1110. In addition to the information normally sent to the endpoint 106 after authentication, the access server 102 sends a message such as a message waiting indicator to inform the endpoint 106 of the stored voicemail. In steps 1112 and 1114, the endpoint 106 retrieves the recorded voicemail and instructs the access point 102 to delete the voicemail from the server.

Figure 12:
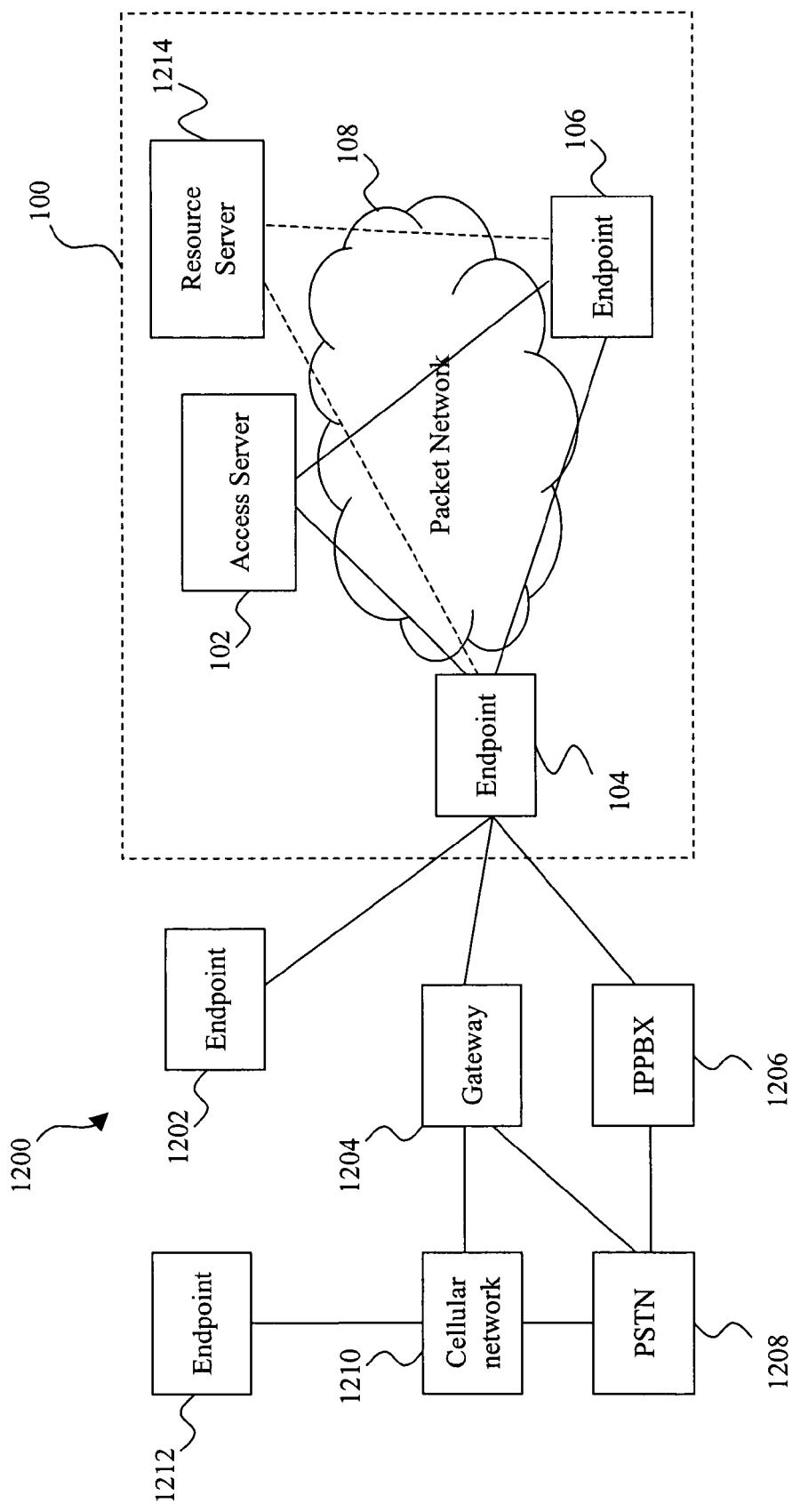
FIG. 12 is a simplified diagram of another embodiment of a peer-to-peer system that is coupled to destinations outside of the peer-to-peer system.

Referring to FIG. 12, in another embodiment, the system 100 of FIG. 1 is illustrated as a "home system" that forms part of a larger system 1200. The home system includes all endpoints that have registered with the access server 102. In addition to the home system 100, a number of external (relative to the home system 100) devices are illustrated, including an external endpoint 1202 (e.g., a SIP capable such as a SIP telephone, a computer, a personal digital assistant, a household appliance, or an automated control system for a business or residence). Additional external devices include a gateway 1204 and an IPPBX 1206, both of which are coupled to a PSTN 1208. The gateway 1204 is also coupled to a cellular network 1210, which includes an radio access network, core network, and other cellular network components (not shown). In the present example, both the gateway 1204 and the IPPBX 1206 include a non-proprietary interface (e.g., a SIP interface) that enables them to communicate directly with the SIP-based endpoints 104 and 106. It is understood that various portions of the system 1200 may include wired and/or wireless interfaces and components.

The endpoints 104 and 106 that are within the home system 100 are authenticated by the access server 102 using user-supplied credentials (as previously described). Communication may occur directly between the endpoints 104, 106 and devices outside of the home system 100 as follows. The access server 102 serves as a routing table repository. As described previously, a routing table contains information needed by the endpoints 104, 106 in order to connect to buddies within the home network 100. In the present example, the routing table (or another routing table) also contains information needed by the endpoints 104, 106 in order to connect to the external devices. Connections to external devices, locations, or services may be subscription based, with the routing table for a particular endpoint only having address information for external devices for which the endpoint has a current subscription. For example, the profile associated with the endpoint 104 may have a flag representing whether the endpoint is subscribed to a service such as a PSTN calling plan.

Figure 13:
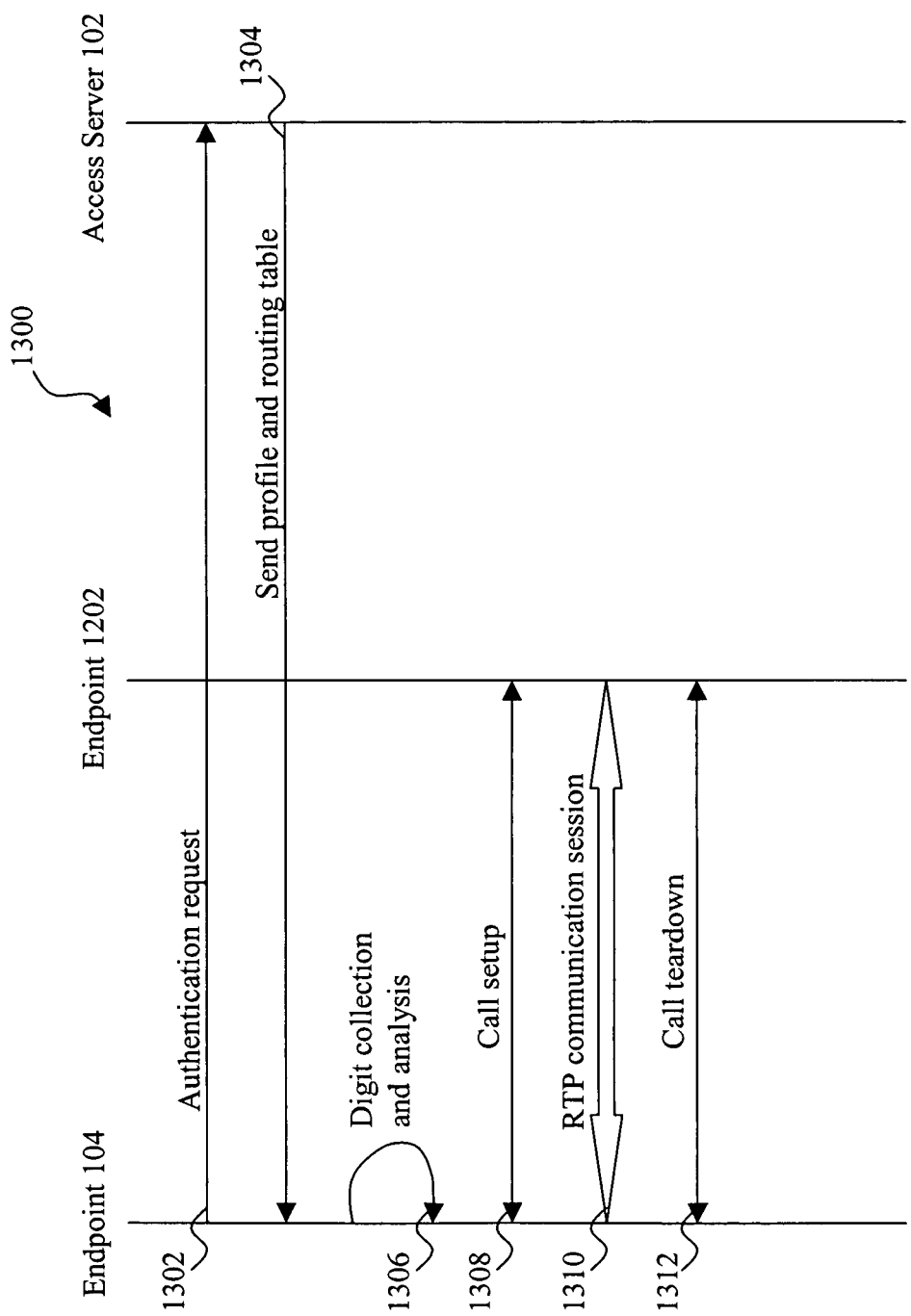
FIG. 13 is a sequence diagram illustrating an exemplary process by which an endpoint of FIG. 12 may directly contact a destination outside of the peer-to-peer system.

Referring to FIG. 13, a sequence diagram 1300 illustrates an exemplary process by which the endpoint 104 may directly contact the external endpoint 1202 within the system 1200 of FIG. 12. The endpoint 1202 is online and the endpoint 104 has the authority (e.g., a subscription) to contact the endpoint 1202. Although the present example uses SIP for signaling and RTP for media traffic, it is understood that other protocols may be used.

In step 1302, the endpoint 104 sends an authentication request message to the access server 102 as described previously. After authentication, the access server 102 sends the profile information and a routing table to the endpoint 104 in step 1304. After the endpoint 104 has been authenticated, the user of the endpoint places a call (e.g., a VoIP call) to the endpoint 1202. In step 1306, the endpoint 104 performs digit collection and analysis on the number entered by the user. As endpoint 104 contains both the routing table and a softswitch, the endpoint is able to identify and place the call directly to the endpoint 1202.

In step 1308, the endpoints 104 and 106 setup the call. For example, the endpoint 104 may sent a SIP INVITE message directly to the endpoint 1202. The endpoint 104 must provide any credentials required by the endpoint 1202. The endpoint 1202 responds with a 200 OK message and the endpoint 104 responds with an ACK message. The endpoints 104 and 1202 may then use an RTP session (step 1310) for the VoIP call. After the RTP session is complete, call teardown occurs in step 1312. Accordingly, as described in the previous examples between endpoints in the home system 100, the endpoint 104 directly contacts the endpoint 1202 (or gateway 1204 or IPPBX 1206) without intervention by the access server 102 after downloading the profile and routing table during authentication.

Another external endpoint 1212 may be contacted in the same manner as the endpoint 1202, although the communications will need to be routed through the gateway 1204 and cellular network 1210. As with the endpoint 1202, the endpoint 104 may contact the endpoint 1212 directly without intervention from the access server 102.

Figure 14:
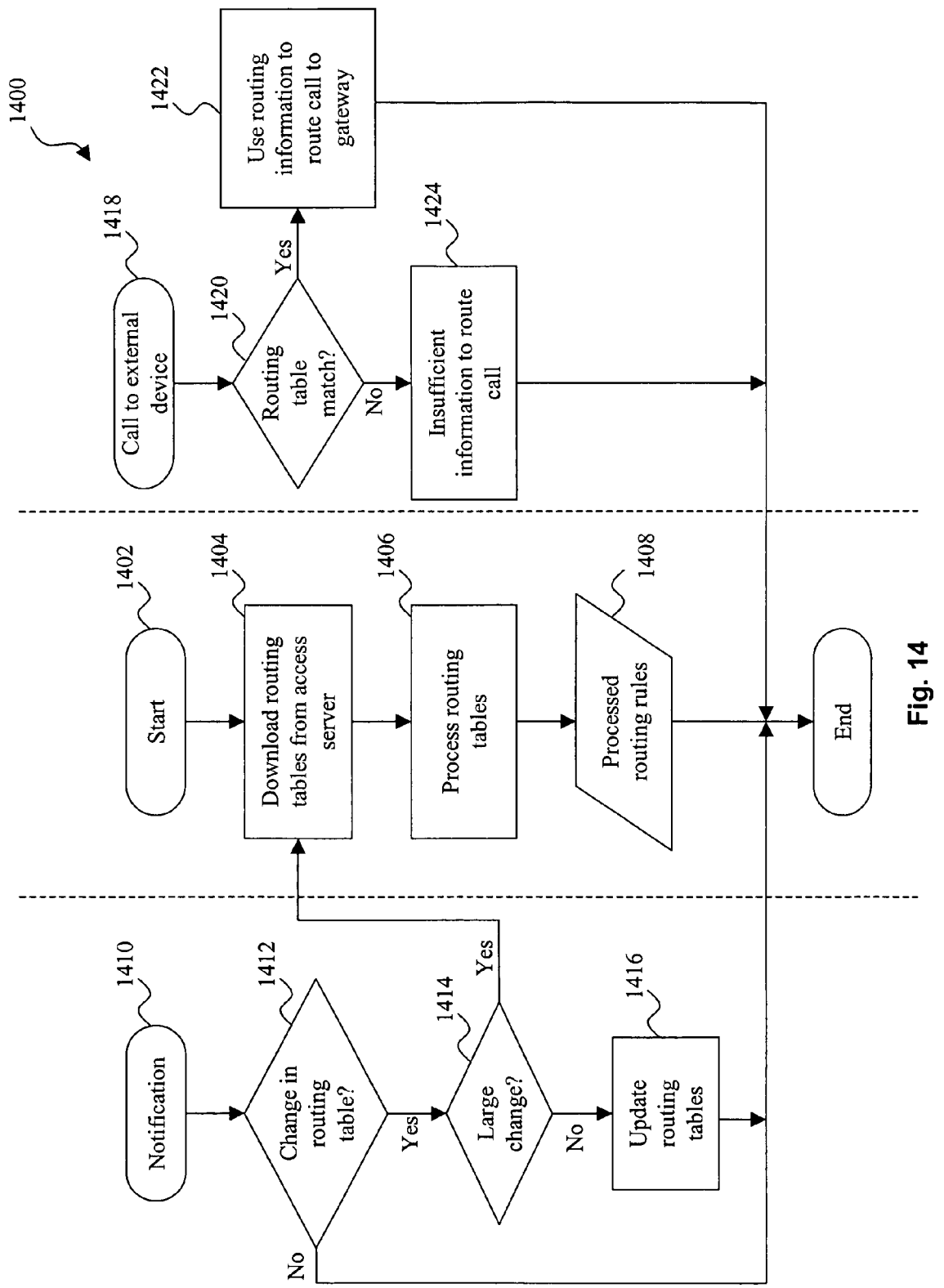
FIG. 14 is a flowchart of one embodiment of a method by which a routing table may be downloaded and utilized by an endpoint.

Referring to FIG. 14, a method 1400 illustrates one possible sequence of events for utilizing the routing tables of the access server 102 for external communications. The method begins in step 1402 when an endpoint (e.g., the endpoint 104) authenticates with the access server 102. The endpoint 104 downloads one or more routing tables in step 1404, depending on such factors as whether the endpoint 104 has a subscription to a relevant service (e.g., whether the endpoint 104 allowed to call outside of the home network). The routing tables are downloaded in a raw data format, and the endpoint 104 processes the raw data in step 1406 to produce optimal routing rules in step 1408. At this point, the endpoint 104 may use the routing rules to communicate with other endpoints.

The routing tables may change on the access server 102. For example, a new service area or new subscription options may become accessible. However, unless the endpoint 104 logs off and back on, the endpoint will not be aware of these changes. Accordingly, the access server 102 sends a notification in step 1410 that changes have occurred to the routing tables. In step 1412, the endpoint 104 determines whether a change has occurred with respect to the routing tables on the endpoint. For example, if the endpoint 104 just logged on, it may have the updated routing tables. Alternatively or additionally, the notification may not indicate which routing tables have changed, and the endpoint 104 will need to determine if any of the routing tables that it uses have changed.

If the routing tables have changed, the endpoint 104 makes a determination in step 1414 as to whether the change is relatively large or is minor. If the change is large, the method returns to step 1404, where the routing tables are downloaded. If the changes are minor, the method continues to step 1416, where the endpoint 104 updates its routing tables (e.g., the endpoint 104 downloads only the changed information). It is understood that some processing may be needed to prepare the new information for insertion into the existing routing rules.

If a call to an external device is to be placed (step 1418), the endpoint 104 determines whether it has a match in its routing rules in step 1420. If a match exists, the endpoint 104 uses the routing rules to route the call to an appropriate gateway or endpoint in step 1422. If no match exists, the endpoint 104 has insufficient information to route the call (step 1424) and ends the call process.

Figure 15:
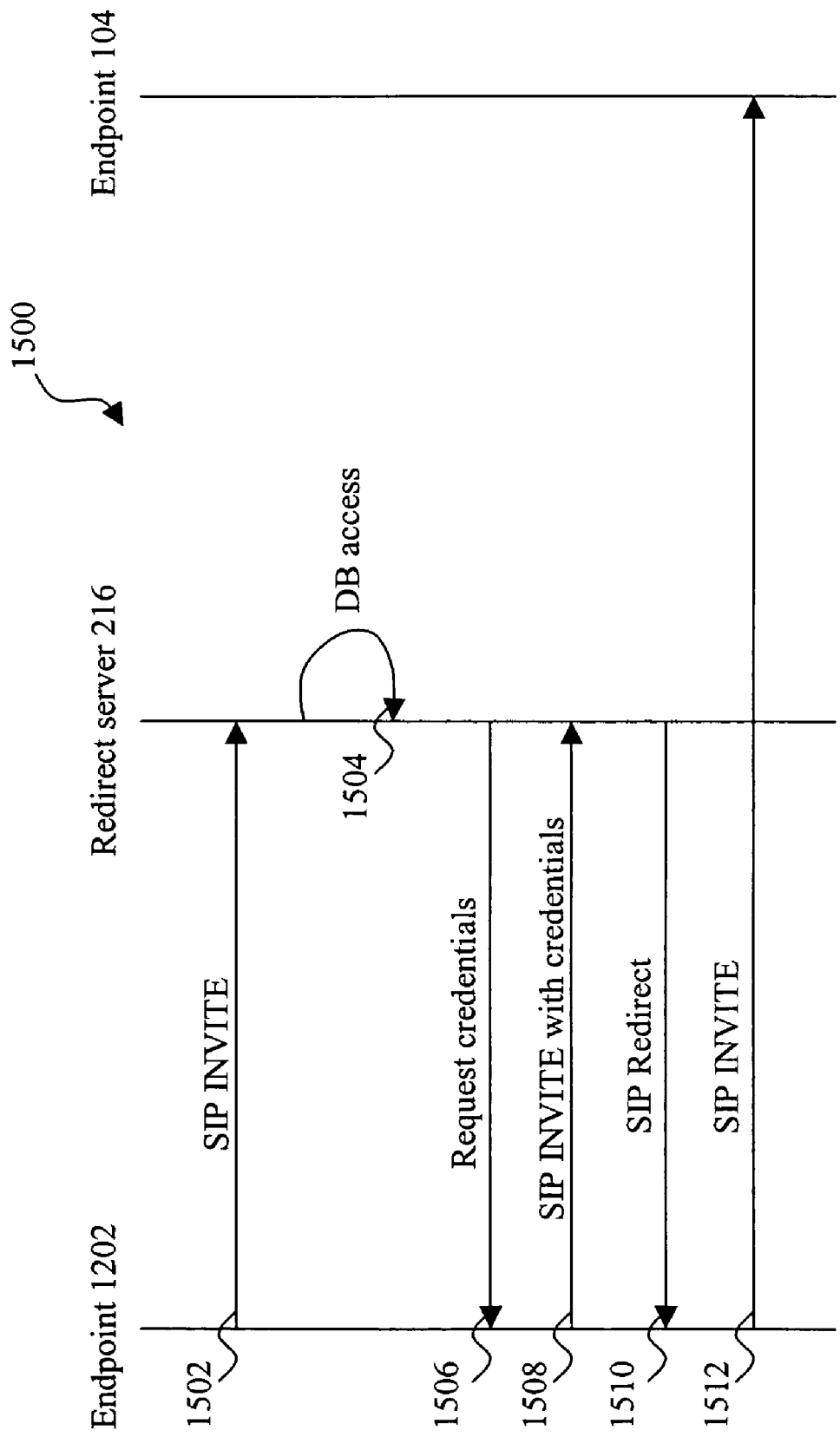
FIG. 15 is a sequence diagram illustrating an exemplary process by which an external device may establish contact with an endpoint within the peer-to-peer system of FIG. 12.

Referring to FIG. 15, a sequence diagram 1500 illustrates an exemplary process by which the external endpoint 1202 may attempt to establish contact with the endpoint 104 within the system 1200 of FIG. 12 using SIP messaging. In step 1502, the endpoint 1202 sends a SIP INVITE message to a redirect server (e.g., the redirect server 216 of FIG. 2a). The redirect server 216 accesses a database (e.g., the database 206 of FIG. 2a) in step 1504 and obtains contact information for the endpoint 104. The information may also include credentials (e.g., a username and password) required by the endpoint 104. If credentials are required, the redirect server 216 sends a message to the endpoint 1202 in step 1506 requesting the credentials. The endpoint 1202 responds to the credentials request in step 1508 by sending a SIP INVITE containing the credentials to the redirect server 216. The redirect server 216 then sends a redirect message to the endpoint 1202 with the address information for the endpoint 104 in step 1510. In step 1512, the endpoint 1202 may then directly contact the endpoint 104 with a SIP INVITE message. If the endpoint 104 is not available (e.g., offline), the redirect server 216 may send a message to the endpoint 1202 that the endpoint 104 is not available.

Referring again to FIG. 12, in the present example, the home system 100 includes a resource server 1214. Although the resource server 1214 may be part of the access server 102, it is separated into a separate server for purposes of illustration. The access server 102 and resource server 1214 may be in communication with one another (not shown) for purposes of identifying access rights and similar issues. The resource server 1214 stores and distributes various resources to the endpoints 104 and 106. As described previously, a resource represents any type of digital data. In operation, an endpoint (e.g., the endpoint 104) may store a resource on the resource server 1214 for later retrieval by the endpoint 106 or may transfer the resource directly to the endpoint 106. Furthermore, the resource server 1214 may distribute the resource to the endpoint 106, as well as to other endpoints. In this manner, the resource server 1214 may serve as temporary or permanent storage. In some embodiments, the resource server 1214 may restrict access based on credentials provided by the endpoints 104 and 106. For example, if the endpoint 104 only has the credentials for certain resources, then the resource server may limit the endpoint's access to those resources. Communication between an endpoint and the resource server occurs directly as described above with respect to two endpoints.

It is understood that many different methods may be implemented using the endpoints and/or access server described above. Various methods are described below as examples, but it is understood that many other methods or variations of methods are possible.

In one embodiment, a port rotation method may be implemented that allows for changing/rotating the port used to listen for communications to provide added security. The rotation may occur during idle time of the operation of the endpoint. For example, when idle time is detected, a random unused port is selected. The endpoint then informs the access server of the new route information and sends out a peer-to-peer notification to all online buddies to notify them of the change in the port/route information.

In another embodiment, wireless calls may be made through an endpoint. For example, a method may be implemented that allows for a direct interface (e.g., using the cellular network interface 280 of FIG. 2*b*) to 3G or any similar wireless network directly from the endpoint in a peer-to-peer hybrid system. When the endpoint is activated, the wireless module informs the wireless network of its presence. At this point, calls can be sent to and received from the wireless network. The endpoint can also bridge calls from the wireless side to the IP side of the network. For example, if a call is received from a wireless phone at the endpoint via the wireless interface, the endpoint's user can choose to route calls to any buddy endpoints on the IP side of the network. This bridging functionality is another capability of the endpoint. Similarly, calls received on the IP side can be bridged to the wireless side.

Figure 16:
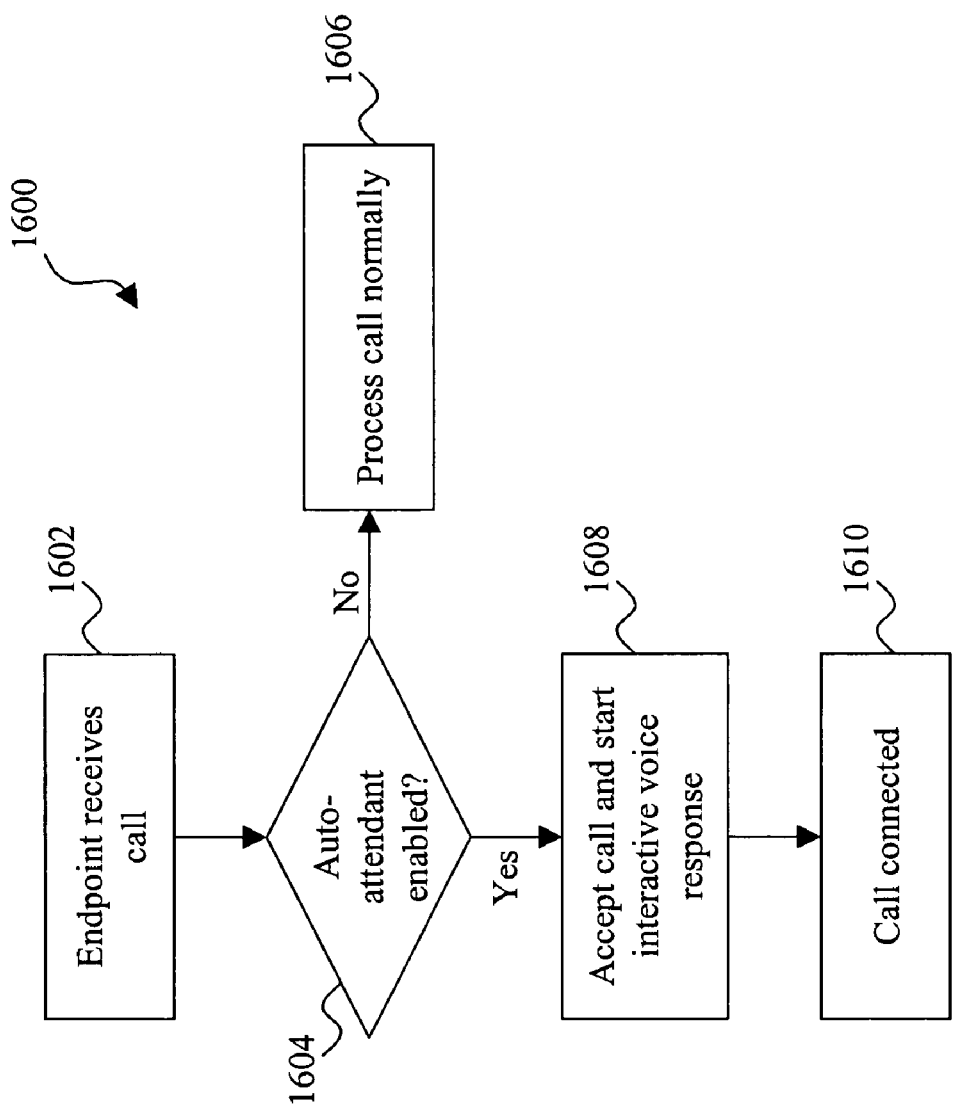
FIG. 16 is a flowchart of one embodiment of a method by which an endpoint may provide interactive voice response functionality.

Referring to FIG. 16, in another embodiment, a method 1600 may be used with interactive voice response (IVR) (e.g., the IVR support provided by the feature layer 264 of FIG. 2*b*) to automatically handle calls when an auto-attendant is turned on. The auto-attendant provides functionality that allows users to perform other tasks when they are busy or not present to attend to calls or other forms of communication. The method 1600 may automatically terminate calls on behalf of the user and perform other tasks as defined by the user (e.g., leave a message or be routed to another destination).

In the present example, the method 1600 begins in step 1602 when the endpoint (e.g., the endpoint 104) receives a call. In step 1604, a determination is made as to whether the auto-attendant is enabled (e.g., whether IVR functionality is on). If it is not enabled, the method continues to step 1606, where the call is processed normally. If it is enabled, the call is accepted and the IVR functionality is started in step 1608. In step 1610, the call is connected.

Figure 17:
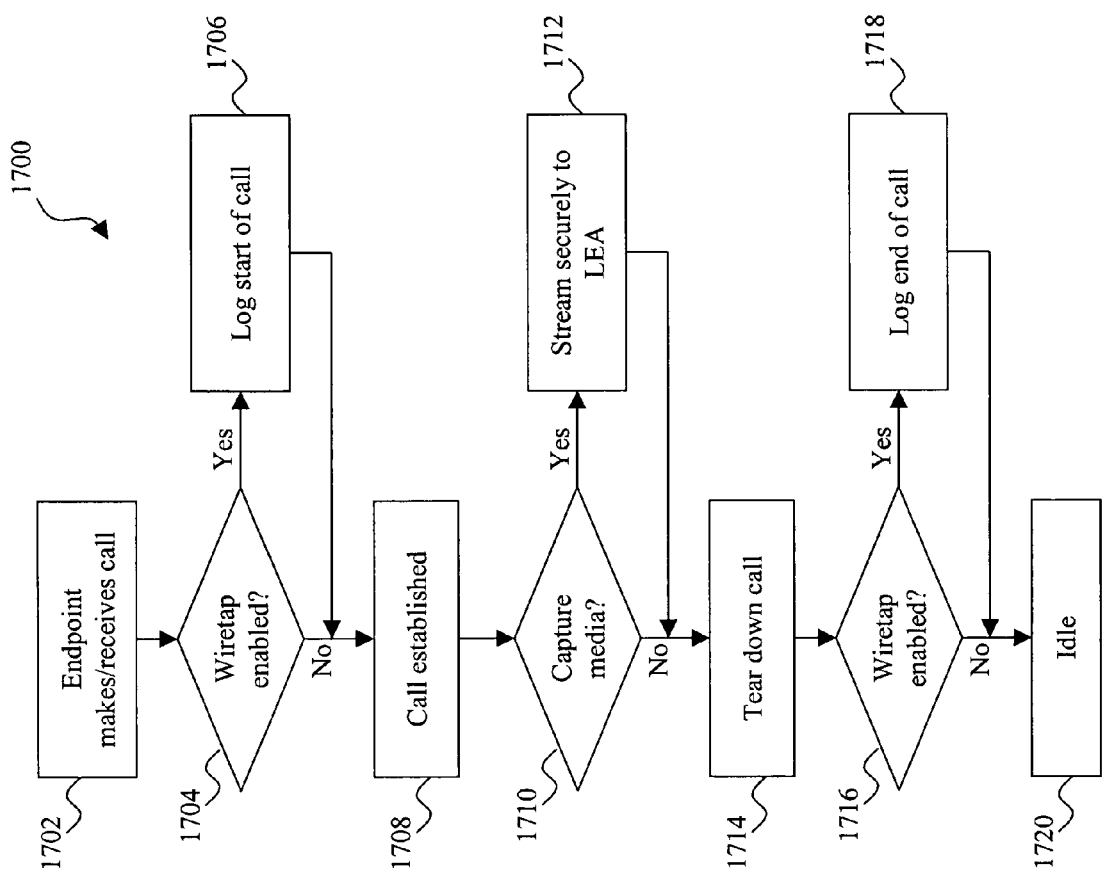
FIG. 17 is a flowchart of one embodiment of a method by which wiretap functionality may be provided on an endpoint.

Referring to FIG. 17, in still another embodiment, a method 1700 may be used to provide wiretap functionality on an endpoint (e.g., the endpoint 104). Such functionality may be provided, for example, by the CALEA agent of the softswitch 258 of FIG. 2*b*. The method begins in step 1702 when the endpoint 104 makes or received a call. If the endpoint is being tapped, as determined in step 1704, the method will continue to step 1706, where the start of the call will be logged. The method 1700 then continues to step 1708, where the call is established. If the endpoint is not being tapped, the method skips step 1706 and proceeds directly to step 1708. In step 1710, a determination is made as to whether media associated with the call is to be captured. If so, the media is captured and securely streamed to a designated law enforcement agency in step 1712. The method then continues to step 1714, where call tear down occurs after the call is ended. If no media is to be captured, the method proceeds directly from step 1710 to step 1714. In step 1718, the end of the call is logged (if a wiretap is enabled as determined in step 1716) and the endpoint 104 returns to an idle state in step 1720. In the present example, the log information is also securely streamed to the law enforcement agency as it is captured.

In another embodiment, a Find Me Follow Me (roaming) method may be used to provide simultaneous multiple sessions for the endpoint in the peer-to-peer hybrid environment. The endpoints can be signed in at multiple locations to access services offered and communicate directly in a peer-to-peer manner with other endpoints that are buddies. In this method, when one endpoint tries to contact his/her buddy, if the buddy is signed on at multiple locations, the originating buddy sends out messages to all signed in locations of the buddy. When the endpoint responds from any one of the multiple signed in locations, requests to other endpoints are dropped and communication is continued with the endpoint that has accepted the request for communication.

Figure 18:
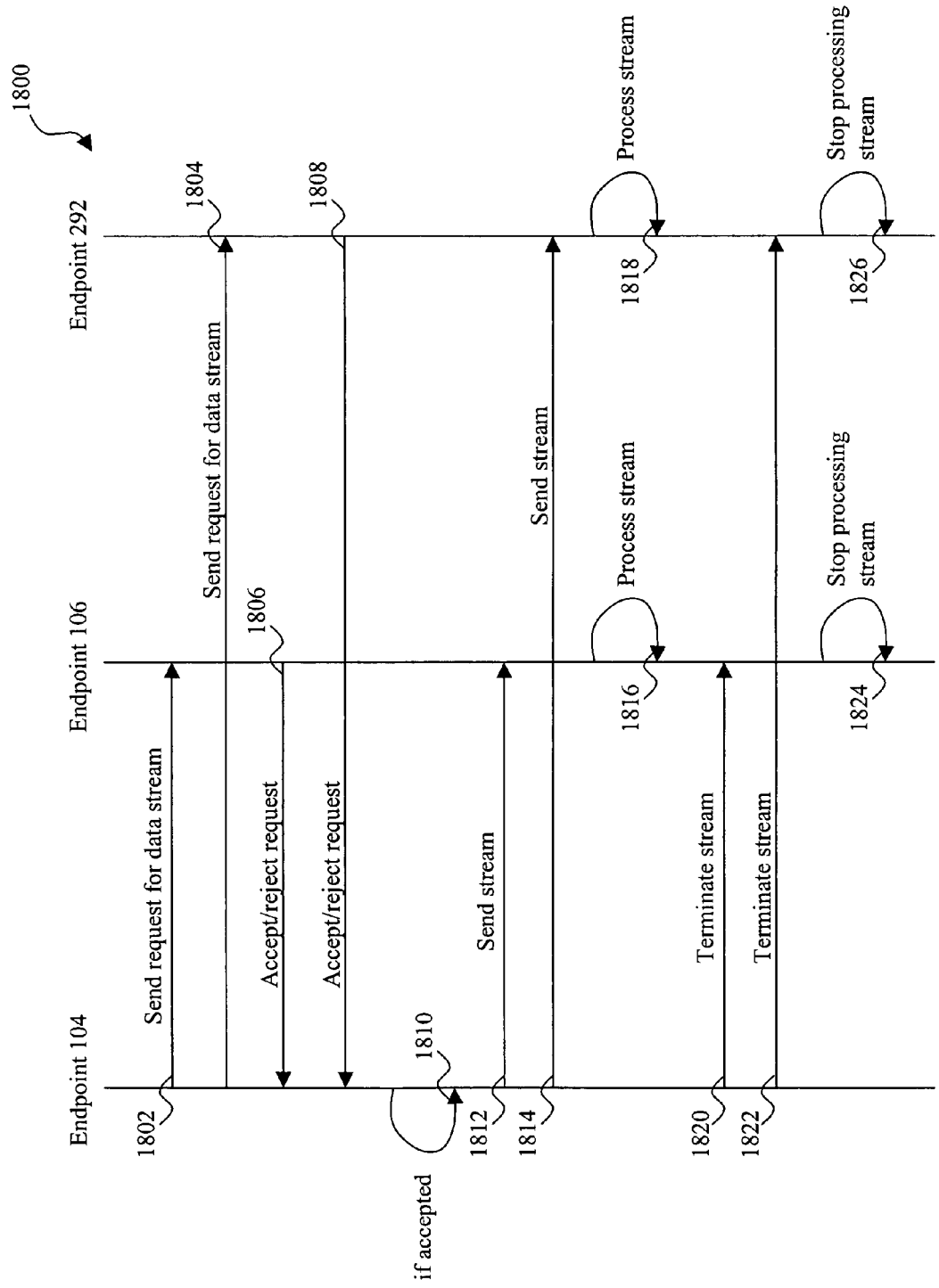
FIG. 18 is a sequence diagram illustrating an exemplary process by which an endpoint may stream data to one or more other endpoints.

Referring to FIG. 18, in still another embodiment, a sequence diagram 1800 illustrates an exemplary process by which the endpoint 104 may stream data in real time to one or more other buddy endpoints 106 and 292 (FIG. 2*g*), either one at a time or simultaneously. In steps 1802 and 1804, respectively, the originating endpoint (e.g., the endpoint 104) sends out a request to stream data to the endpoints 106 and 292. The endpoints receiving the request may respond with messages either accepting or rejecting the request (steps 1806 and 1808). Once the request is accepted (as indicated in step 1810), the data stream is sent out to all buddies that have accepted the request for the data stream (steps 1812 and 1814). On the terminating endpoints 106 and 292, the user chooses an application that can handle the processing of the data stream to utilize the data. It is understood that some applications may be automatically selected by the endpoint for recognized or predefined data types. The streams are then processed by the relevant endpoint (steps 1816 and 1818). In steps 1820 and 1822, respectively, the endpoint 104 sends out a request to the endpoints 106 and 292 to terminate the stream. The endpoints 106 and 292 stop their processing in steps 1824 and 1826, respectively.

In yet another embodiment, a method for Smart I™ (as developed by Damaka, Inc., of Richardson, Tex.) or Enhanced IM may be used to convert textual data sent to and received by the endpoint into speech by employing a text-to-speech recognition system in real-time. Textual data can be received from the network or locally for conversion to speech/voice signals for playback. Such functionality may be provided, for example, by the text-to-speech engine 270 of FIG. 2*b*.

In another embodiment, a method to convert speech/voice data that is sent to and received by the endpoint into text form by employing a speech-to-text system in real-time. Speech/voice data can be received from the network or locally for conversion to text data for processing by the user. Such functionality may be provided, for example, by the speech-to-text engine 268 of FIG. 2*b*.

In one embodiment, a method may be used to provide correction services (e.g., spell check) on textual data being sent/received by the endpoint. In another embodiment, a method may provide functionality to allow a user to search the world wide web or internet via search engines for additional information related to textual data being sent/received by the endpoint. In yet another embodiment, a method may provide functionality for performing language conversion on textual data being sent/received by the endpoint using one or more language conversion engines (e.g., the language conversion engine 272 of FIG. 2*b*.).

In still another embodiment, a method may provide functionality enabling textual data received by the endpoint to be archived on the endpoint for later retrieval. For example, a database (e.g., SQL) engine may be used to store and index data received by the endpoint from a buddy for faster retrieval. A standard query interface may then be used to store/retrieve data for presentation to the user.

In another embodiment, a method may be used to provide SMS functionality. Such functionality may be provided, for example, by the SMS feature of the feature layer 264 of FIG. 2*b*. For example, an SMS table may be downloaded with the routing table when an endpoint logs onto the network. If the endpoint has a mobile setting, the endpoint may be able to communicate directly via the SMS functionality.

Figure 19:
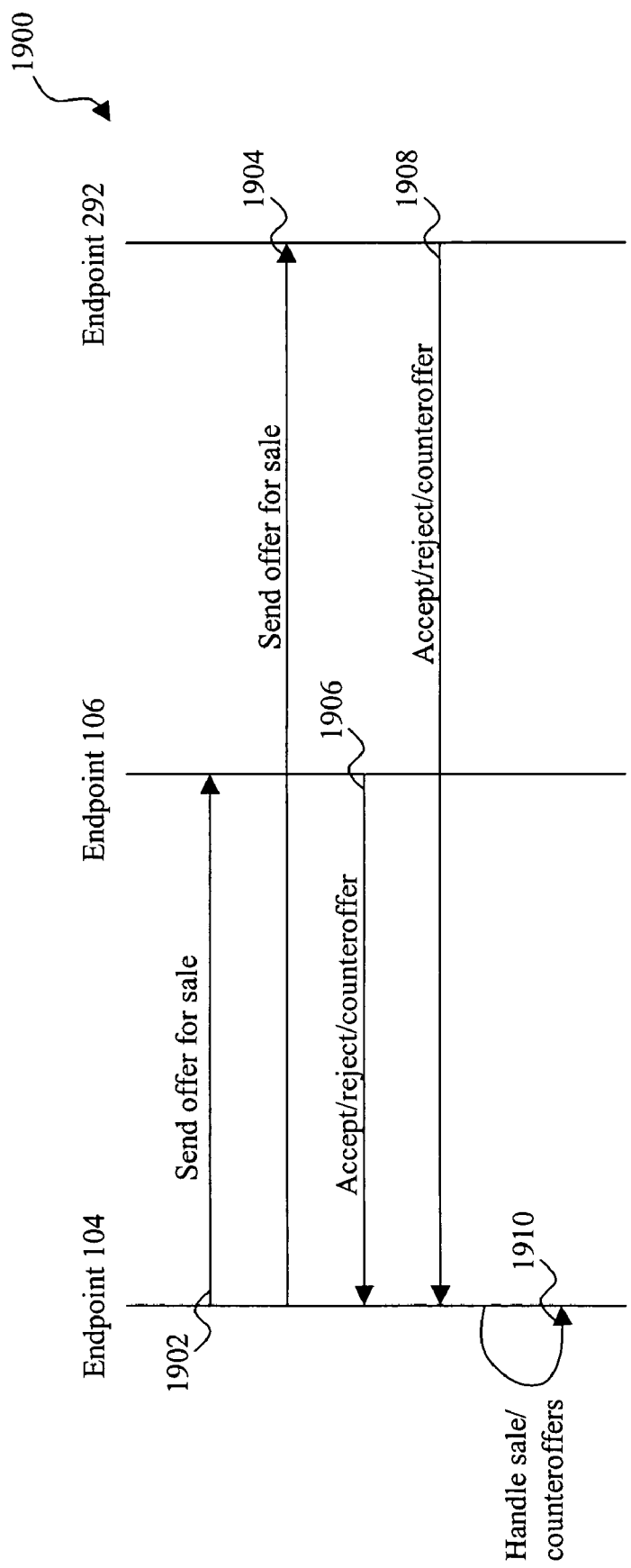
FIG. 19 is a sequence diagram illustrating an exemplary process by which an endpoint may conduct a private transaction with one or more buddy endpoints.

Referring to FIG. 19, in another embodiment, a sequence diagram 1900 illustrates an exemplary process by which the endpoint 104 may initiate a private transaction (e.g., make an offer for sale or start an auction process) to buddies represented by endpoints 106 and 292 (FIG. 2g). In steps 1902 and 1904, respectively, the endpoint 104 sends a message containing an offer to sale one or more items to the endpoints 106 and 292. In steps 1906 and 1908, respectively, the endpoints 106 and 292 may return messages accepting or rejecting the offer, or making a counteroffer. The user of the endpoint 104 may review the received messages and accept one, reject both, reply to one or both with an additional counteroffer, etc., in step 1910. This process (offer, response, review) may continue until the offer is either finally accepted or rejected. In the present example, because the interaction occurs between buddies, the actual financial transaction may not occur electronically.

Figure 20:
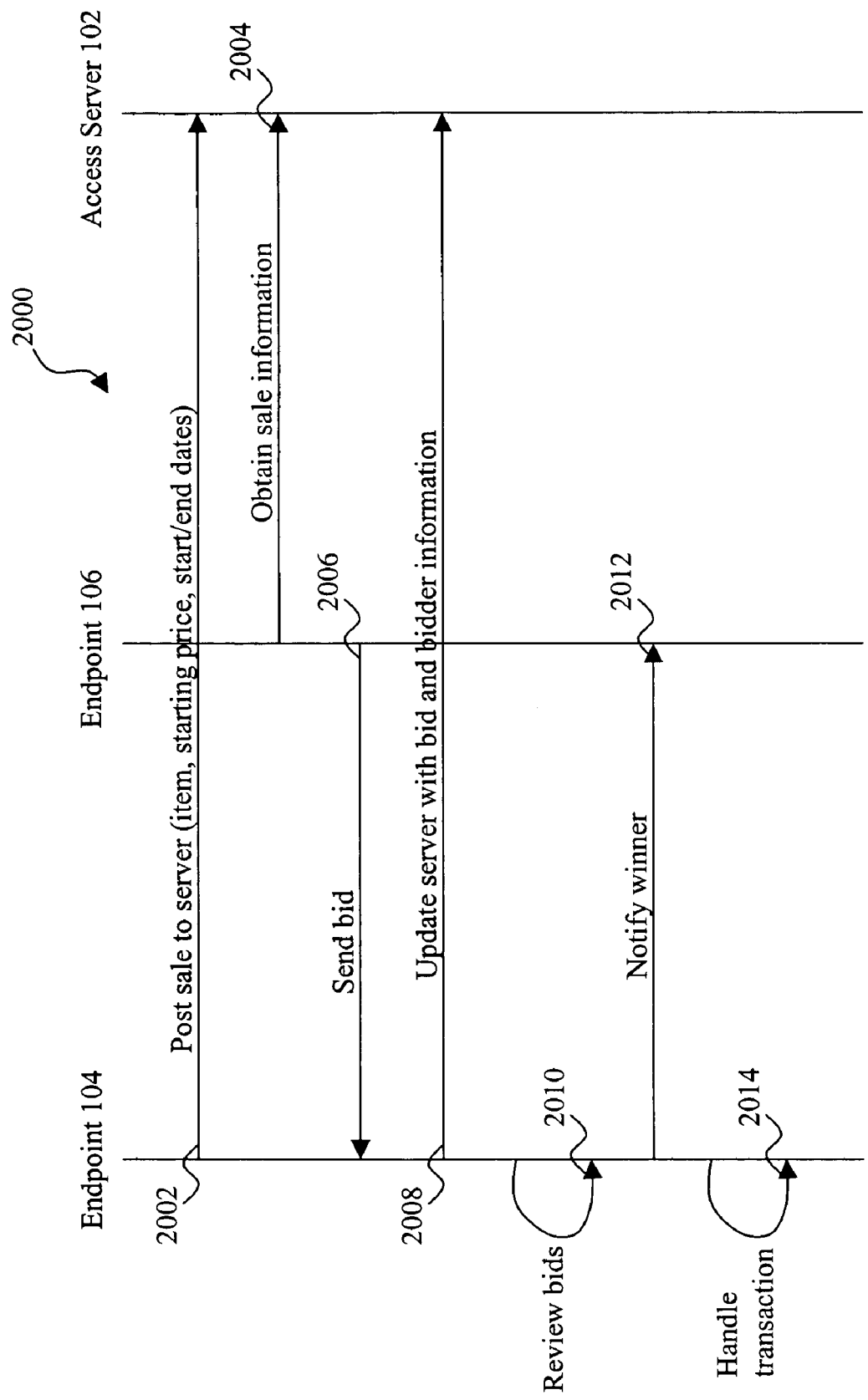
FIG. 20 is a sequence diagram illustrating an exemplary process by which an endpoint may conduct a public transaction with one or more other endpoints.

Referring to FIG. 20, in yet another embodiment, a sequence diagram 2000 illustrates an exemplary process by which the endpoint 104 may initiate a public transaction (e.g., make an offer or start an auction process). In step 2002, the endpoint 104 sends a message to the access server 102 to post a sale. The message contains information such as a description of the item for sale, a starting price, and the start/end dates of the auction. In step 2004, the endpoint 106 (which is not a buddy in the present example) obtains the sale information from the server. The obtained information includes a "substitute ID" of the endpoint 104 and associated address information. The substitute ID, which may be assigned to the endpoint 104 exclusively for the sale, enables the endpoint 106 to contact the endpoint 104 directly without obtaining the actual ID of the user of the endpoint 104. Accordingly, when the sale ends, the endpoint 106 will no longer be able to contact the endpoint 104.

In step 2006, the endpoint 106 sends a message directly to the endpoint 104 with a bid. In step 2008, the endpoint 104 updates the information on the access server with the bid and bidder information. Although not shown, buddy endpoints may also bid on the posted item. In step 2010, the user of the endpoint 104 reviews the bids, selects a winner (if a winner exists), and notifies the winner directly (step 2012). In step 2014, the sale transaction is handled. In the present example, because the transaction may occur between parties that are not buddies, the transaction may be accomplished via a third party clearinghouse. However, if a buddy won the sale, the parties may revert to a private transaction. Additionally, it is understood that any parties (whether or not they are buddies) may arrange the transaction as desired. In some embodiments, the process may include directly or indirectly notifying involved parties of a pending bid, notifying involved parties of accepted/rejected bids, etc. The seller may also accept any bid desired (e.g., not only the highest bid) and may end the bidding at any time. If an endpoint is offline when bidding occurs (e.g., if the endpoint 104 is offline when the message of step 2006 is sent or if the endpoint 106 is offline when the message of step 2012 is sent), the message may be downloaded during authentication when the endpoint logs in as previously described.

Referring to FIG. 21, in still another embodiment, a sequence diagram 2100 illustrates an exemplary process by which the endpoint 104 may initiate a conference call with other endpoints (e.g., the endpoints 106 and 1202, both of which are buddies with the endpoint 104 in the present example). It is noted that the endpoints 106 and 1202 may or may not be buddies with each other. In steps 2102 and 2104, respectively, the endpoint 104 sends a request to join a conference call to the endpoints 106 and 1202. The endpoints 106 and 1202 respond in steps 2106 and 2108, respectively, by either accepting or rejecting the request. In the present example, both endpoints 106 and 1202 accept the request (as indicated by step 2110).

The endpoint 104 may then send media (e.g., text or voice information) to the endpoints 106 and 1202 in steps 2112 and 2114, respectively. Incoming media (e.g., from the endpoint 106) is received by the endpoint 104 in step 2116 and sent to the endpoint 1202 by the endpoint 104 in step 2118. In the present example, rather than multicasting the information, the endpoint 104 hosts the conference call by using a separate peer-to-peer connection with each endpoint. As the endpoints 106 and 1202 are connected in the conference call via the endpoint 104 and are not communicating with each other directly, the endpoints 106 and 1202 do not need to be buddies. Accordingly, the endpoint 104 in the present example may have two routing entries associated with the conference call: one routing entry for endpoint 106 and another routing entry for endpoint 1202. In other embodiments, multicasting may be used to transmit the data from the endpoint 104 to the endpoints 106 and 1202.

It is understood that the process described with respect to FIG. 21 may be applied to other scenarios. For example, the endpoint 104 may serve as the host for a multiplayer game. Incoming data may then be distributed by the endpoint to other endpoints that are associated with the hosted game.

While the preceding description shows and describes one or more embodiments, it will be understood by those skilled in the art that various changes in form and detail may be made therein without departing from the spirit and scope of the present disclosure. For example, various steps illustrated within a particular sequence diagram may be combined or further divided. In addition, steps described in one diagram may be incorporated into another diagram. For example, the STUN request/response steps of FIG. 5 may be incorporated into diagrams that do not show this process. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A computer-implemented method for establishing and maintaining a real time data streaming communication session between a first endpoint and second and third endpoints in a peer-to-peer network using a non-proprietary protocol, the method comprising:

sending an authentication message to an access sewer by the first endpoint;

receiving a profile and a routing table from the access sever by the first endpoint in response to the authentication message, wherein the profile identifies the second and third endpoints as endpoints with which the first endpoint has permission to communicate, and the routing table contains address information needed for the first endpoint to communicate directly with the second and third endpoints;

sending a notification message from the first endpoint directly to the second and third endpoints using the address information to inform the second and third endpoints that the first endpoint is online;

sending a request message from the first endpoint directly to the second and third endpoints using the address information to request the establishment of the real time data streaming communication session;

receiving, by the first endpoint, first and second response messages directly from the second and third endpoints, respectively;

establishing the real time data streaming communication session by the first endpoint directly with each of the second and third endpoints only if the respective first and second response messages grant permission; and directly streaming data in real time from the first endpoint simultaneously to the second and third endpoints, wherein all signaling and media traffic messages are sent directly from the first endpoint to the second and third endpoints and directly from the second and third endpoints to the first endpoint.

2. The method of claim 1 further comprising:

identifying whether the second endpoint is online based on the profile; and sending the notification message only if the second endpoint is online.

3. The method of claim 1 further comprising:

sending a STUN (Simple Traversal of UDP through NATs (Network Address Translation)) request from the first endpoint to a STUN server prior to the authentication process; and using information received from the STUN server in response to the STUN request during the authentication process.

4. The method of claim 3 further comprising:

determining by the access server that the second endpoint is behind a device that will prevent it from receiving messages initiated by the first endpoint;

instructing the second endpoint to periodically send a message to the access server to maintain a first communication channel through the device; and prior to sending the profile and routing table to the first endpoint, instructing the second endpoint via the first communication channel to send a message to the first endpoint to open a second communication channel through the device for the first endpoint, wherein the first endpoint's notification message can traverse the device through the second communication channel to reach the second endpoint.

5. The method of claim 4 wherein the second endpoint closes the second communication channel if the first endpoint's notification message is not received within a predetermined period of time.

6. The method of claim 1 further comprising:

waiting for a response message sent from the second endpoint in response to the notification message; and if the response message is not received within a predetermined period of time, modifying a status of the second endpoint at the first endpoint to reflect the non-responsiveness.

7. The method of claim 1 further comprising:

sending a request message from the first endpoint directly to the second endpoint using the address information to request the establishment of a voice call;

receiving a response message by the first endpoint directly from the second endpoint, wherein the response message indicates that the second endpoint cannot currently accept the request;

recording a voicemail at the first endpoint; and sending the voicemail for storage on both the second endpoint and the access server.

8. The method of claim 7 further comprising:

receiving the voicemail at the second endpoint; and sending an instruction from the second endpoint to the access server to delete the voicemail from the access server.

9. The method of claim 1 further comprising determining by the first endpoint that the second endpoint is currently offline;

recording a voicemail at the first endpoint;

sending the voicemail for storage on the access server;

receiving a message waiting indicator by the second endpoint from the access server during an authentication process of the second endpoint; and retrieving the voicemail from the access server by the second endpoint.

10. The method of claim 1 further comprising:

sending a deletion message from the second endpoint to the access server indicating that the first endpoint no longer has permission to communicate with the second endpoint;

updating the profile of the first endpoint on the access server to reflect the lack of permission;

sending a deletion message from the second endpoint directly to the first endpoint indicating that the first endpoint no longer has permission to communicate with the second endpoint; and deleting the information corresponding to the second endpoint that is stored at the first endpoint in real time upon receipt of the deletion message.

11. A computer-implemented method for establishing and maintaining a relationship between first and second endpoints, the method comprising:

determining, by the first endpoint, whether the second endpoint is on a buddy list of the first endpoint;

sending a request message from the first endpoint to an access server requesting contact information for the second endpoint if the second endpoint is not on the buddy list;

determining by the access server whether the second endpoint is online or offline;

receiving the contact information by the first endpoint from the access server if the second endpoint is online;

sending a request message directly from the first endpoint to the second endpoint requesting that the first endpoint be added to a buddy list associated with the second endpoint;

receiving a response message by the first endpoint directly from the second endpoint either accepting or rejecting the request; and sending a message from the second endpoint to the access server to inform the access server that the request was accepted or rejected.

12. The method of claim 11 further comprising updating profile information associated with each of the first and second endpoints to reflect the relationship if the request was accepted.

13. The method of claim 11 further comprising:

storing the request message sent from the first endpoint to the access server if the second endpoint is offline;

sending the request message to the second endpoint from the access server during an authentication process of the second endpoint, wherein the authentication process indicates that the second endpoint is coming online;

sending a response message from the second endpoint directly to the first endpoint either accepting or rejecting the request; and sending a message from the second endpoint to the access server to inform the access server that the result was accepted or rejected.

14. The method of claim 11 further comprising:

storing the request message sent from the first endpoint to the access server if the second endpoint is offline;

determining by the access server that the first endpoint is offline when the second endpoint comes online;

sending the request message to the second endpoint from the access server during an authentication process of the second endpoint; and sending a response message from the second endpoint to the access server either accepting or rejecting the request.

15. A method executable by a first endpoint for establishing and maintaining a communication session with a second endpoint associated with unique identifying information on an access server in a peer-to-peer network, the method comprising:

sending an authentication message to the access server;

receiving a profile and a routing table from the access server in response to the authentication message and storing the profile and routing table on the first endpoint, wherein the profile indicates that the second endpoint has expressly granted the first endpoint permission to communicate with the second endpoint, and the routing table contains address information needed for the first endpoint to communicate directly with the second endpoint;

notifying the second endpoint that the first endpoint is online by sending a first notification message from the first endpoint directly to the second endpoint, wherein the first notification message informs the second endpoint that the first endpoint is available for a communication session with the second endpoint;

waiting for a response to the first notification message;

updating a status of the second endpoint as offline in the profile if no response is received to the first notification message;

receiving a second notification message sent directly to the first endpoint from the second endpoint, wherein the second notification message informs the first endpoint that the second endpoint is going offline;

marking, by the first endpoint, the status of the second endpoint as offline in the profile after receiving the second notification message;

after marking the status of the second endpoint as offline, receiving a third notification message sent directly to the first endpoint from the second endpoint, wherein the third notification message informs the first endpoint that the second endpoint is online;

marking, by the first endpoint, a status of the second endpoint as online in the profile after receiving the third notification message;

receiving a fourth notification message sent directly to the first endpoint from a third endpoint after marking, by the first endpoint, the status of the second endpoint as online in the profile after receiving the third notification message, wherein the fourth notification message informs the first endpoint that the third endpoint is online, and wherein the third endpoint is associated with the same unique identifying information on the access server as the second endpoint;

marking, by the first endpoint, a status of the third endpoint as online in the profile after receiving the fourth notification message;

sending, by the first endpoint, a communication request message to both of the second and third endpoints associated with the unique identifying information;

receiving, by the first endpoint, a response to the communication request message from only one of the second and third endpoints; and establishing a communication session only with the second or third endpoint that sent the response to the communication request message.

16. The method of claim 15 further comprising:

receiving a removal request sent directly to the first endpoint from the second endpoint, wherein the removal request rescinds the permission expressly granted to the first endpoint by the second endpoint; and removing, by the first endpoint, the second endpoint from the profile.

17. The method of claim 15 further comprising:

receiving a removal request from the access server during the authentication process, wherein the removal request rescinds the permission expressly granted to the first endpoint by the second endpoint; and removing, by the first endpoint, the second endpoint from the profile after retrieving and storing the profile on the first endpoint.

18. The method of claim 15 further comprising determining, by the first endpoint, whether the second endpoint is online based on the profile, wherein the determining occurs before sending the first notification message from the first endpoint to the second endpoint.

19. The method of claim 15 further comprising:

notifying the second endpoint that the first endpoint is going offline by sending a fourth notification message from the first endpoint directly to the second endpoint; and notifying the access server that the first endpoint is going offline by sending a fifth notification message from the first endpoint directly to the access server.

20. The method of claim 15 further comprising:

receiving, by the first endpoint, a message from the access server that routing information stored on the access server was changed after the first endpoint retrieved the routing table during the authentication process;

determining, by the first endpoint, whether the change to the routing information affects the routing table; and modifying, by the first endpoint, the routing table to reflect at least a portion of the change to the routing information if the change affects the routing table.

21. The method of claim 20 wherein the modifying includes retrieving only a changed portion of the routing information from the access server and updating the routing table using the changed portion.

22. The method of claim 20 wherein the modifying includes retrieving an updated routing table from the access server and replacing the routing table received in response to the authentication message with the updated routing table.

* * * * *

UNITED STATES PATENT AND TRADEMARK OFFICE
CERTIFICATE OF CORRECTION

PATENT NO. : 7,656,870 B2
APPLICATION NO. : 11/081068
DATED : February 2, 2010
INVENTOR(S) : Sivakumar Ravikumar, Satish Gundabathula and Rameshkumar Ravikumar It is certified that error appears in the above-identified patent and that said Letters Patent is hereby corrected as shown below:

Col. 18, Claim 1, line 47, delete "sewer" and insert therefor --server--

Col. 18, Claim 1, line 49, delete "sever" and insert therefor --server--

Signed and Sealed this

Eighth Day of June, 2010

David J. Kappos
*Director of the United States Patent and Trademark Office*